United States Patent
Yu

(10) Patent No.: US 12,293,528 B2
(45) Date of Patent: May 6, 2025

(54) VIDEO DATA PROCESSING METHOD AND APPARATUS, COMPUTER DEVICE, AND STORAGE MEDIUM

(71) Applicant: Tencent Technology (Shenzhen) Company Limited, Shenzhen (CN)

(72) Inventor: Ziqiang Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 417 days.

(21) Appl. No.: 17/882,479

(22) Filed: Aug. 5, 2022

(65) Prior Publication Data

US 2022/0383511 A1    Dec. 1, 2022

Related U.S. Application Data

(63) Continuation of application No. PCT/CN2021/113566, filed on Aug. 19, 2021.

(30) Foreign Application Priority Data

Aug. 27, 2020  (CN) .......................... 202010880221.8

(51) Int. Cl.
*G06T 7/215* (2017.01)
*G06T 5/70* (2024.01)
*G06T 7/13* (2017.01)

(52) U.S. Cl.
CPC ............... *G06T 7/215* (2017.01); *G06T 5/70* (2024.01); *G06T 7/13* (2017.01); *G06T 2207/10016* (2013.01)

(58) Field of Classification Search
CPC .. G06T 7/215; G06T 5/70; G06T 7/13; G06T 2207/10016; G06T 7/246;
(Continued)

(56) References Cited

U.S. PATENT DOCUMENTS 5,566,251 A    10/1996  Hanna et al.
5,923,791 A    7/1999   Hanna et al.
(Continued)

FOREIGN PATENT DOCUMENTS

CN    102073652 A    5/2011
CN    107566756 A    1/2018
(Continued)

OTHER PUBLICATIONS

Tencent Technology, Extended European Search Report, EP21860263.9, Jun. 7, 2023, 8 pgs.
(Continued)

*Primary Examiner* — Samir A Ahmed
(74) *Attorney, Agent, or Firm* — Morgan, Lewis & Bockius LLP

(57) ABSTRACT

This application discloses a video data processing method and apparatus, a computer device, and a storage medium, and belongs to the field of video processing technologies. According to this application, when a second video is embedded into a target sub-image of a first video, a position movement of the target sub-image in the first video is obtained based on an artificial intelligence technology. According to the position movement, motion blur processing is performed on the picture of the second video correspondingly, so that the second video, after being embedded into the first video, will have the same motion blur effect as the target sub-image in the first video. Therefore, the first video and the second video can be better fused, and a better video transition effect can be obtained.

20 Claims, 12 Drawing Sheets

(58) Field of Classification Search
CPC . G06T 2207/20012; G06T 2207/20084; G06T 2207/20201; G06V 10/44; G06V 20/40; G06V 20/42; G06V 20/46; G06V 2201/07; H04N 5/265
See application file for complete search history.

(56) References Cited

U.S. PATENT DOCUMENTS

| | | | |
|---|---|---|---|
| 2013/0176332 | A1 | 7/2013 | Alenius |
| 2016/0323526 | A1* | 11/2016 | Washisu ............... H04N 23/672 |
| 2017/0357860 | A1 | 12/2017 | Lee et al. |
| 2019/0089923 | A1* | 3/2019 | Katano ............. G06V 10/7715 |
| 2019/0130585 | A1 | 5/2019 | Tandon et al. |
| 2020/0227089 | A1* | 7/2020 | Xiao ...................... H04N 5/911 |

FOREIGN PATENT DOCUMENTS

| | | |
|---|---|---|
| CN | 109671097 A | 4/2019 |
| CN | 110008814 A | 7/2019 |
| CN | 110786002 A | 2/2020 |
| CN | 111464716 A | 7/2020 |
| CN | 111556336 A | 8/2020 |
| CN | 112749613 A | 5/2021 |
| DE | 102019121570 A1 | 2/2020 |
| WO | WO 2009107487 A1 | 9/2009 |
| WO | WO 2019198570 A1 | 10/2019 |

OTHER PUBLICATIONS

Jiaya Jia et al., "Single Image Motion Deblurring Using Transparency", 2007 IEEE Conference on Computer Vision and Pattern Recognition, Jun. 22, 2007, 8 pgs.

Tencent Technology, ISR, PCT/CN2021/113566, Nov. 22, 2021, 2 pgs.

Tencent Technology, WO, PCT/CN2021/113566, Nov. 22, 2021, 4 pgs.

Tencent Technology, IPRP, PCT/CN2021/113566, Feb. 28, 2023, 5 pgs.

* cited by examiner

VIDEO DATA PROCESSING METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2021/113566, entitled "VIDEO DATA PROCESSING METHOD AND APPARATUS, AND COMPUTER DEVICE AND STORAGE MEDIUM" filed on Aug. 19, 2021, which claims priority to Chinese Patent Application No. 202010880221.8, filed with the State Intellectual Property Office of the People's Republic of China on Aug. 27, 2020, and entitled "VIDEO DATA PROCESSING METHOD AND APPARATUS, COMPUTER DEVICE, AND STORAGE MEDIUM", all of which are incorporated herein by reference in their entirety.

FIELD OF THE TECHNOLOGY

This application relates to the field of video processing technologies, and in particular, to a video data processing method and apparatus, a computer device, and a storage medium.

BACKGROUND OF THE DISCLOSURE

Video transition effects refer to special effects added when two video clips are merged, so that the two videos can transition naturally. For example, photo frame transition is a commonly used video transition effect. The photo frame transition is to identify a photo frame region that appears in a picture of a first video, and replace a picture in the photo frame region with a picture of a second video, thereby implementing the transition from the first video to the second video.

In the foregoing video data processing process, when there is motion blur in the picture of the first video, directly replacing the picture in the photo frame region with the picture of the second video results in a poor effect of fusing the picture of the first video and the picture of the second video, which severely affects the video transition effect.

SUMMARY

Embodiments of this application provide a video data processing method and apparatus, a computer device, and a storage medium, which can optimize the effect of transition between two videos. The technical solutions are as follows:

According to an aspect, a video data processing method is provided, including:

obtaining a first video and a second video;

determining region movement information of a plurality of video frames of the first video, the region movement information being used for indicating position movement of a target sub-image in every two adjacent video frames of the plurality of video frames of the first video;

performing motion blur processing on a plurality of first video frames of the second video based on the region movement information of the plurality of video frames of the first video, to obtain a plurality of second video frames of the second video; and embedding the second video into the first video by replacing the target sub-image in the plurality of video frames of the first video with the corresponding second video frames of the second video to obtain a target video.

According to an aspect, a video data processing apparatus is provided, including:

an obtaining module, configured to obtain a first video and a second video;

a determining module, configured to determine region movement information of a plurality of video frames of the first video, the region movement information being used for indicating position movement of a target sub-image in every two adjacent video frames of the plurality of video frames of the first video;

a motion blur processing module, configured to perform motion blur processing on a plurality of first video frames of the second video based on the region movement information of the plurality of video frames of the first video, to obtain a plurality of second video frames of the second video; and a replacement module, configured to embed the second video into the first video by replace the target sub-image in the plurality of video frames of the first video with the corresponding second video frames of the second video to obtain a target video.

According to an aspect, a computer device is provided, including one or more processors and one or more memories, the one or more memories storing at least one program code, the at least one program code being loaded and executed by the one or more processors to implement the operations performed in the video data processing method.

According to an aspect, a non-transitory computer-readable storage medium is provided, storing at least one program code, the at least one program code being loaded and executed by a processor of a computer device to implement the operations performed in the video data processing method.

According to an aspect, a computer program product is provided, including at least one program code, the at least one program code being stored in a computer-readable storage medium. A processor of a computer device reads the at least one program code from the computer-readable storage medium, and executes the at least one program code, to cause the computer device to implement the operations performed in the video data processing method.

In the technical solutions provided in the embodiments of this application, when the target sub-image of the first video is replaced with the second video to embed the second video into the first video, the position movement of the target sub-image in the first video is obtained. According to the position movement, motion blur processing is performed on the picture of the second video correspondingly, so that the second video and the first video have the same motion blur effect. Therefore, the first video and the second video can be better fused, and a better video transition effect can be obtained.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer, the following further describes implementations of this application in detail with reference to the accompanying drawings. Evidently, the described embodiments are a part rather than all the embodiments of this application. All other embodiments obtained by a person of ordinary skill in the art based on the embodiments of this application without creative efforts shall fall within the protection scope of this application.

The terms "first", "second", and the like in this application are used for distinguishing between same items or similar items of which effects and functions are basically the same. The "first", "second", and "nth" do not have a dependency relationship in logic or time sequence, and a quantity and an execution order thereof are not limited.

The embodiments of this application are mainly used for making transition effect videos. For example, line segment detection is performed on video frames in a video to track a photo frame in the video frames, thereby accurately determining positions of the photo frame in the video frames. Further, video frames in another video are added to the photo frame to implement photo frame transition. Alternatively, line segment detection is performed on video frames in a video to track a target sub-image such as a mirror, a book page, or a screen of a device such as a tablet computer or a notebook computer included in the video frames, thereby accurately determining a position of such a target sub-image. Further, video frames in another video are added to such a target sub-image to implement the transition effect.

Figure 1:
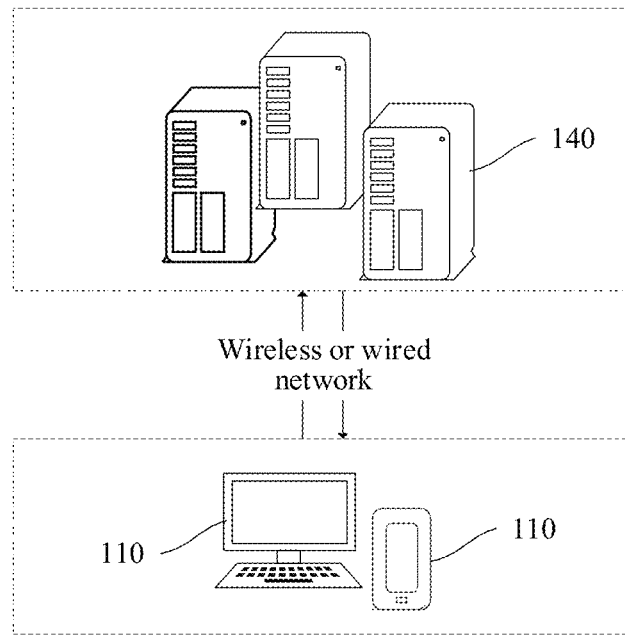
FIG. 1 is a schematic diagram of an implementation environment of a video data processing method according to an embodiment of this application.

FIG. 1 is a schematic diagram of an implementation environment of a video data processing method according to an embodiment of this application. Referring to FIG. 1, the implementation environment includes a terminal 110 and a video editing platform 140.

The terminal 110 may be a smartphone, a tablet computer, a notebook computer, a desktop computer, a smart speaker, a smartwatch, or the like, but is not limited thereto. A target application that supports video editing is installed and run on the terminal 110. For example, the terminal 110 is a terminal used by a user, and the application running on the terminal 110 logs in to a user account. The terminal 110 may generally refer to one of a plurality of terminals. In this embodiment, the terminal 110 is merely used as an example for description.

The video editing platform 140 is configured to provide a background service for the target application. In some embodiments, the video editing platform 140 is responsible for the main video data processing work, and the terminal 110 is responsible for the secondary video data processing work; or the video editing platform 140 is responsible for the secondary video data processing work, and the terminal 110 is responsible for the main video data processing work; or the video editing platform 140 or the terminal 110 may be independently responsible for the video data processing work. The main video data processing work and the secondary video data processing work may be distinguished according to a data volume, importance, or processing difficulty of video data to be processed. This is not limited in this embodiment of this application. In some embodiments, the video editing platform 140 includes an access server, a video data processing server, and a database. The access server is configured to provide an access service for the terminal 110. The video data processing server is configured to provide background services related to video editing, such as video synthesis and video special effect addition. There may be one or more video data processing servers. When there are a plurality of video data processing servers, at least two video data processing servers are configured to provide different services, and/or at least two video data processing servers are configured to provide the same service, for example, provide the same service in a load balancing manner. This is not limited in this embodiment of this application. A line segment detection model may be arranged in the video data processing server to identify and track a target sub-image in video frames. The server may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

The terminal 110 and the video editing platform 140 may be directly or indirectly connected in a wired or wireless communication manner. This is not limited in this embodiment of this application.

A person skilled in the art may learn that there may be more or fewer terminals. For example, there may be only one terminal, or there may be dozens of or hundreds of terminals or more. The quantity and the device type of the terminal are not limited in the embodiments of this application.

The video data processing method provided in the embodiments of this application is applicable to a plurality of types of applications. For example, in a video editing application, when a photo frame transition effect is added to two videos, that is, a second video is embedded into a photo frame in a first video for display, a line segment detection model constructed based on a neural network is used to identify line segments in video frames of the first video, thereby tracking a target sub-image enclosed by the line segments, that is, the photo frame. Applying this target sub-image tracking method does not require the user to manually adjust tracking points in each video frame, thereby improving the accuracy of tracking the target sub-image. In a video synthesis stage, based on a position movement of the photo frame in the first video, motion blur processing is performed on video frames of the second video, so that the second video has the same motion blur effect as the first video. Therefore, the synthesized video is more realistic, and the transition effect is more natural.

Figure 2:
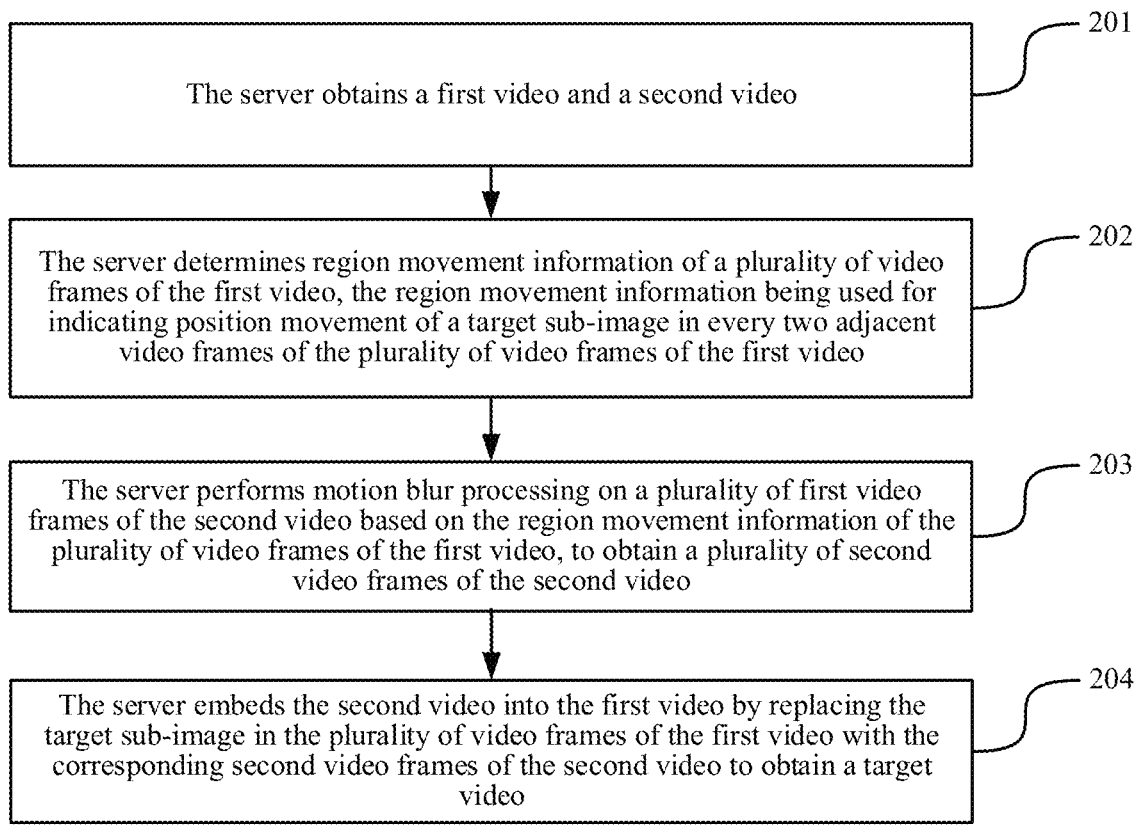
FIG. 2 is a flowchart of a video data processing method according to an embodiment of this application.

FIG. 2 is a flowchart of a video data processing method according to an embodiment of this application. The method may be performed by a computer device, where the computer device may be a terminal or a server, for example, may be the terminal or the server in the implementation environment shown in FIG. 1. In this embodiment of this application, the server is used as an execution entity to described the video data processing method. Referring to FIG. 2, this embodiment may further include the following steps:

201: The server obtains a first video and a second video.

Figure 3:
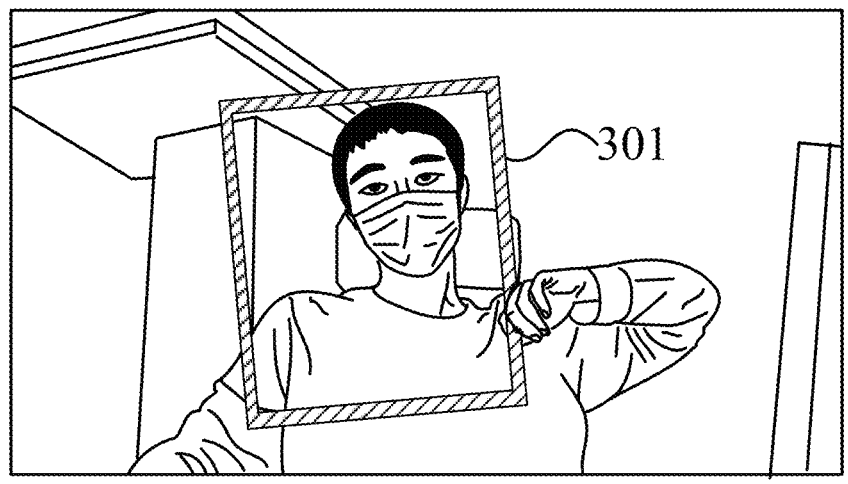
FIG. 3 is a schematic diagram of a video frame picture of a first video according to an embodiment of this application.

The first video and the second video are videos to be synthesized, a photo frame is displayed in video frames of the first video, and a picture framed by the photo frame needs to be replaced with video frames of the second video. For example, FIG. 3 is a schematic diagram of a video frame picture of a first video according to an embodiment of this application. As shown in FIG. 3, the video frame picture shows that a user holds a photo frame 301. Certainly, the photo frame may be alternatively replaced with another item, such as a cardboard and another item that may be determined as a sub-image. Taking the picture shown in FIG. 3 as an example, the first video may alternatively include a shot of the user holding the cardboard. In this case, during subsequent video synthesis, a picture framed by the cardboard needs to be replaced with the video frames of the second video. In this embodiment of this application, only an example in which the first video displays the photo frame is used for description.

In some embodiments, the server may obtain the first video and the second video in response to a video editing request. The video editing request may be sent by any terminal. This is not limited in this embodiment of this application.

202: The server determines region movement information of a plurality of video frames of the first video, the region movement information being used for indicating position movement of a target sub-image in every two adjacent video frames of the plurality of video frames of the first video.

In this embodiment of this application, taking the video frames of the first video including the photo frame as an example, the target sub-image is an image framed by the photo frame. In some embodiments, the server may identify a frame of the photo frame based on line segment detection, and then determine the image framed by the photo frame, that is, the target sub-image, thereby tracking the target sub-image. In the first video, the rapid movement of the position of the photo frame causes the sub-image framed by the photo frame, that is, the target sub-image, to have a motion blur effect. In this embodiment of this application, the server needs to obtain the position movement of the target sub-image in every two adjacent video frames, where the position movement are used for indicating the motion blur degree of the target sub-image in each video frame of the first video.

203: The server performs motion blur processing on a plurality of first video frames of the second video based on the region movement information of the plurality of video frames of the first video, to obtain a plurality of second video frames of the second video. In some embodiments, the plurality of first video frames of the second video are an identical video frame. In other words, the second video is a static image. But after the motion blur processing, there is at least one difference between any two of the plurality of second video frames of the second video.

In some embodiments, the server may perform motion blur processing on the plurality of first video frames of the second video by using a filter, where the filter may include at least one convolution layer. For example, for each pixel in a first video frame, the server may perform a convolution operation to average the pixel and surrounding pixels of the pixel to obtain an average pixel corresponding to the pixel. A new picture formed by average pixels corresponding to pixels in the video frame is a second video frame.

204: The server embeds the second video into the first video by replacing the target sub-image in the plurality of video frames of the first video with the corresponding second video frames of the second video to obtain a target video.

For example, if an $i^{th}$ frame of the first video corresponds to a $j^{th}$ frame of the second video, the server may replace the target sub-image in the $i^{th}$ frame of the first video with the $j^{th}$ frame of the second video. The $j^{th}$ frame is a second video frame obtained after motion blur processing. i is an integer greater than 1, and j is a positive integer. After completing the video frame replacement, the server obtains a target video, and sends the target video to the terminal.

In the technical solutions provided in the embodiments of this application, when the target sub-image of the first video is replaced with the second video to embed the second video into the first video, the position movement of the target sub-image in the first video is obtained based on an artificial intelligence technology. According to the position movement, motion blur processing is performed on the picture of the second video correspondingly, so that the second video and the first video have the same motion blur effect. Therefore, the first video and the second video can be better fused, and a better video transition effect can be obtained.

Figure 4:
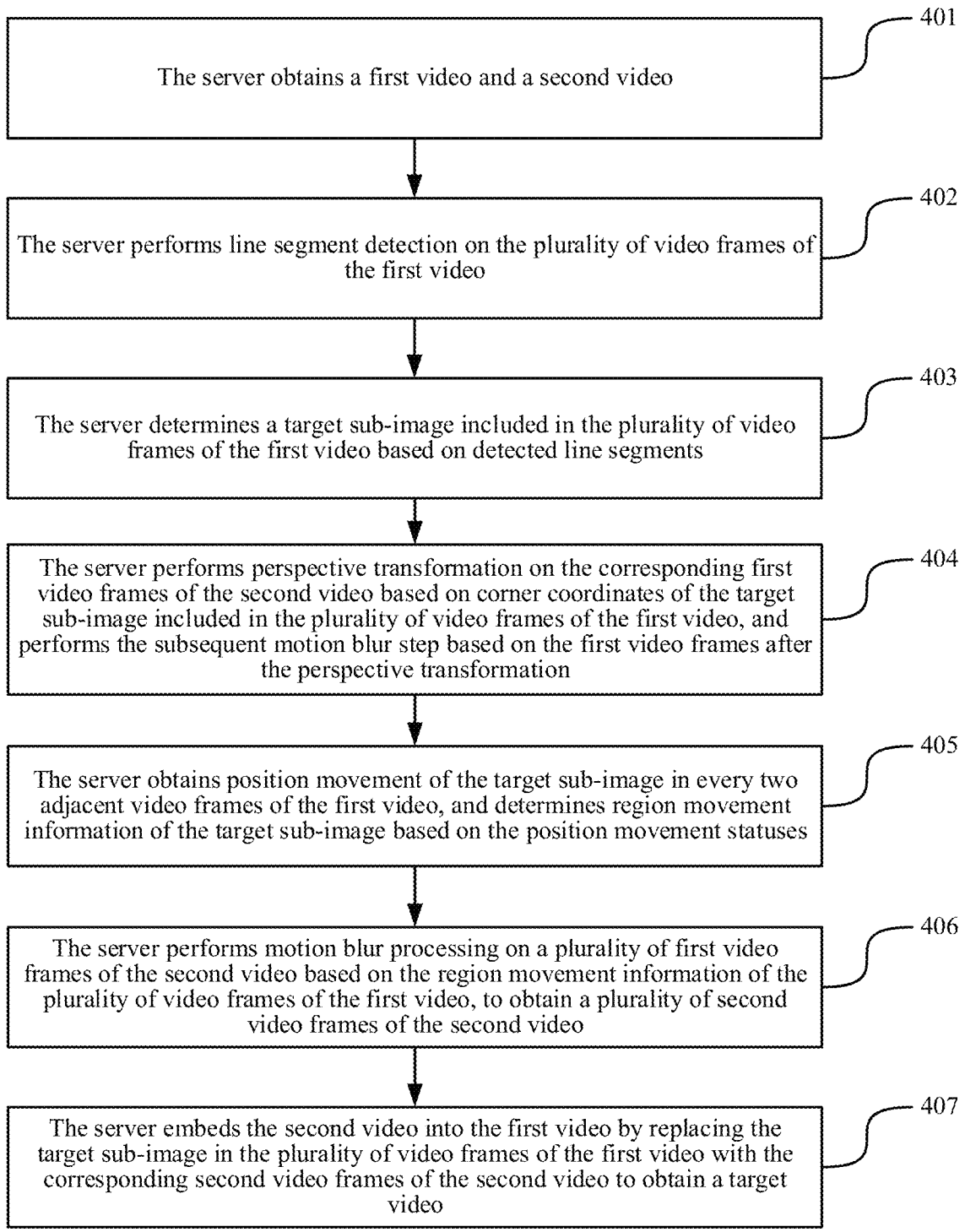
FIG. 4 is a flowchart of a video data processing method according to an embodiment of this application.

The foregoing embodiment is a brief introduction to this implementation of this application FIG. 4 is a flowchart of a video data processing method according to an embodiment of this application. The foregoing video data processing process is described in detail with reference to FIG. 4.

401: The server obtains a first video and a second video.

In some embodiments, the server obtains the first video and the second video based on a video editing request of the terminal. For example, the video editing request carries video identifiers of the first video and the second video, and the server obtains, in response to the video editing request, the videos indicated by the video identifiers from a database. The database may be used for storing videos pre-uploaded by the user. In some embodiments, the terminal may alternatively send the video editing request, the first video, and the second video to the server. The method used for obtaining the first video and the second video is not limited in this embodiment of this application.

402: The server performs line segment detection on the plurality of video frames of the first video.

In an example of this application, a photo frame is displayed in the first video, and an image framed by the photo frame is a sub-image to be replaced with the video frames of the second video. In some embodiments, the photo frame is displayed in each video frame of the first video, and the server performs line segment detection on each frame of the first video. In some embodiments, the photo frame is displayed in some video frames of the first video, that is, the photo frame is displayed in a specific video clip in the first video. In this case, the server may determine, after obtaining the first video, the video clip in the first video in which the photo frame is displayed, and perform line segment detection on the video frames in the video clip. Which video frames in the first video the server performs line segment detection on is not limited in this embodiment of this application.

Figure 5:
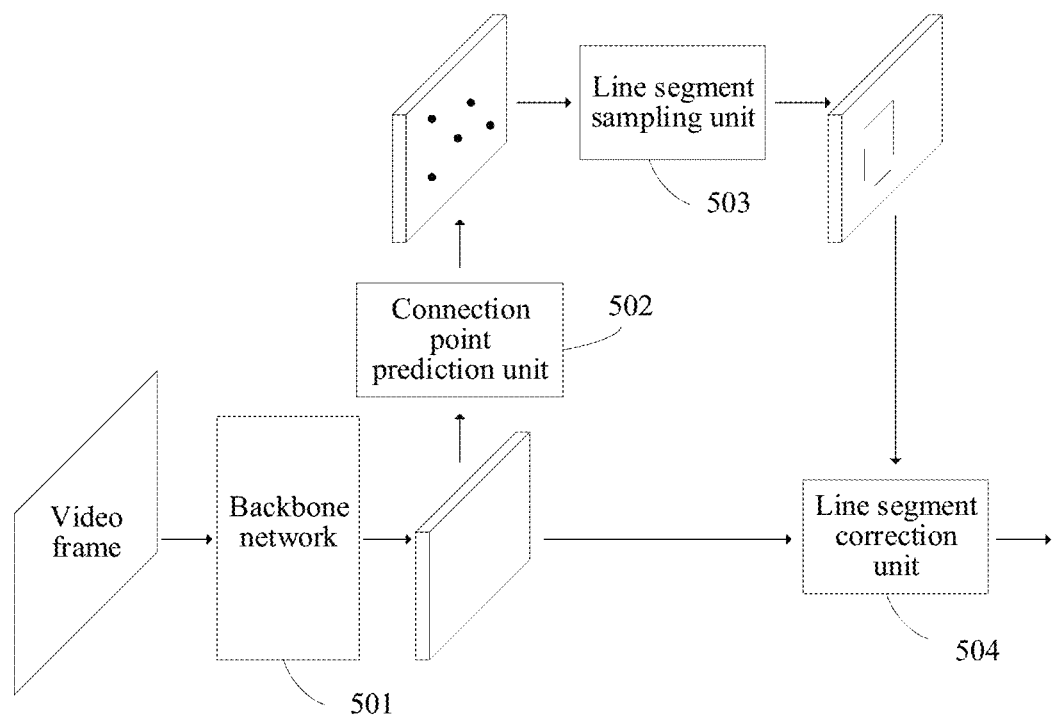
FIG. 5 is a schematic diagram of a line segment detection model according to an embodiment of this application.

In some embodiments, the server may perform line segment detection on the video frames based on a line segment detection model, where the line segment detection model is a model constructed based on a deep neural network. For example, the line segment detection model is an L-CNN model. The type of the line segment detection model is not limited in this embodiment of this application. Only the L-CNN model is used as an example for description in this embodiment of this application. FIG. 5 is a schematic diagram of a line segment detection model according to an embodiment of this application. Referring to FIG. 5, the line segment detection model may include a backbone network 501, a connection point prediction unit 502, a line segment sampling unit 503, and a line segment correction unit 504. The backbone network 501 is configured to perform feature extraction on a video frame to obtain a feature map corresponding to the video frame. The connection point prediction unit 502 is configured to predict connection points included in the video frame based on the feature map of the video frame. The line segment sampling unit 503 is configured to predict line segments based on the connection points, and determine confidence corresponding to each predicted line segment. The line segment correction unit 504 performs line segment screening based on an output result of the line segment sampling unit 503. The method for line segment detection is described below with reference to FIG. 5, and the method may include the following steps:

Step 1: The server performs feature extraction on each video frame of the first video to obtain a feature map corresponding to the video frame.

In some embodiments, the server inputs each video frame of the first video into the line segment detection model, and the backbone network of the line segment detection model performs feature extraction on each video frame respectively. The backbone network may be a network constructed based on Stacked Hourglass Networks. The server sequentially performs convolution operations on a pixel matrix corresponding to the video frame by using a plurality of convolution layers of different scales in the backbone network, to extract semantic features of the video frame, thereby obtaining the feature map corresponding to the video frame. The foregoing description of the method for obtaining the feature map is merely an exemplary description. The method used for obtaining the feature map is not limited in this embodiment of this application.

Step 2: The server determines connection points included in the video frame based on the feature map corresponding to the video frame.

The connection points are used for determining endpoints of line segments in the subsequent line segment identification process, and the endpoints of the line segments and intersections of the line segments in the video frame may all be identified as the connection points.

In some embodiments, the server inputs the feature map outputted by the backbone network to the connection point prediction unit, and performs further convolution operations on the feature map through the plurality of convolution layers in the connection point prediction unit to predict the connection points included in the video frame. For example, the server first divides the feature map into a plurality of sub-regions. The server then performs a convolution operation on the sub-regions in the feature map based on a first convolution kernel to obtain a probability feature map, and performs a convolution operation on the probability feature map based on a second convolution kernel to obtain a position feature map. An element in the probability feature map is used for indicating a probability that a connection point exists in a corresponding sub-region. An element in the position feature map is used for indicating position information of a connection point in a corresponding sub-region. In some embodiments, the position information may be represented as an offset of the position of the connection point relative to a center point of the sub-region. The server finally determines the connection points included in the video frame based on the probability feature map and the position feature map. For example, each element in the probability feature map is represented by a value of 0 or 1. When the element is 1, it means that a sub-region corresponding to the element includes a connection point. When the element is 0, it means that the sub-region corresponding to the element does not include a connection point. The server determines target sub-regions including connection points based on the probability feature map, and then determines positions of the connection points in the target sub-regions based on the position feature map. The specific values of the parameters in the first convolution kernel and the second convolution kernel are not limited in this embodiment of this application.

Step 3: The server determines line segments included in the video frame based on the connection points.

In some embodiments, the server inputs an output result of the connection point prediction unit to the line segment sampling unit to obtain a candidate line segment list, that is, a connection point pair list. The connection point pair list includes a plurality of connection point pairs, and each connection point pair includes two connection points. The two connection points are respectively used as endpoints of a line segment, so that each connection point pair can represent a candidate line segment. The candidate line segment list and the feature map outputted by the backbone network are then inputted into the line segment correction unit. Line segment features of each candidate line segment are extracted by a line of interest (LoI) pooling layer of the line segment correction unit. A classification result of each candidate line segment is determined based on the line segment features by at least one fully connected layer. For example, the fully connected layer may output confidence corresponding to each candidate line segment. The server obtains candidate line segments whose confidence is greater than a target threshold as the line segments included in the video frame. The target threshold may be set by the developer, and this is not limited in the embodiments of this application.

The foregoing description of the line segment detection method is merely an exemplary description. The method used for performing line segment detection is not limited in this embodiment of this application.

403: The server determines a target sub-image included in the plurality of video frames of the first video based on detected line segments.

Figure 6:
FIG. 6 is a schematic diagram of reference region labeling according to an embodiment of this application.

In this embodiment of this application, the server obtains, from the line segments detected in a first frame of the first video, line segments closest to a frame of a reference region as target line segments, and determines an image in a region enclosed by the target line segments as the target sub-image. The reference region is a user-specified region. In addition, when a specific video clip in the first video includes the target sub-image, the first frame may refer to a first frame of the video clip. In some embodiments, when the user edits the videos, that is, applies the photo frame transition effect to the two videos, the user may first label the region framed by the photo frame in the first frame of the first video, that is, label the reference region. For example, a target application for video editing is run on the terminal of the user. The user may label the reference region in the target application. FIG. 6 is a schematic diagram of reference region labeling according to an embodiment of this application. An interface of the target application displays a first frame 601 of the first video, and the user labels a reference region 602 in the form of a rectangular frame. In some embodiments, the terminal may send position information of the reference region in the first frame to the server. After detecting line segments included in the first frame, the server determines distances between the line segments and frame line segments of the reference region. For example, for a frame line segment of the reference region, the server determines distances between endpoints of the frame line segment and endpoints of each line segment detected in the first frame, and obtains, according to the distances between the endpoints of the frame line segment and endpoints of each line segment detected, a line segment closest to the frame line segment as a target line segment. In this way, the server determines a target line segment closest to each frame line segment of the reference region, and then determines an image in a region enclosed by the target line segments or extension lines of the target line segments as the target sub-image. In this embodiment of this application, the target sub-image is determined based on the reference region labeled by the user and a prediction result of the line segment detection model. In one aspect, the reference region may screen data results of the line segment detection model and remove a large number of interfering line segments, to accurately determine the target sub-image. In another aspect, since the frame of the target sub-image is determined based on the line segments identified by the line segment detection model, the user only needs to label an approximate position when labeling the reference region, which reduces the difficulty of labeling for the user.

In this embodiment of this application, for video frames after the first frame in the first video, the server obtains, from the line segments detected in an $i^{th}$ frame, line segments closest to target line segments in an $(i-1)^{th}$ frame as target line segments in the $i^{th}$ frame, and determines an image in a region enclosed by the target line segments in the $i^{th}$ frame as the target sub-image, where i is an integer greater than 1. In some embodiments, a distance between line segments may be represented by a distance between endpoints of the line segments. That is, the server obtains line segment endpoint coordinates of line segments included in the current frame and line segment endpoint coordinates of line segments included in the previous frame; and determines, based on differences between horizontal and vertical coordinates of the line segment endpoints, the distance between the line segments. For example, the foregoing method for determining the distance between the line segments may be expressed as the following formula (1):

$$d = \sum_{i=1}^{2}\sqrt{\left(L_{current}^{x_i} - L_{pre}^{x_i}\right)^2 + \left(L_{current}^{y_i} - L_{pre}^{y_i}\right)^2}, \tag{1}$$

where d represents the distance between the line segments; and pre is used to represent the previous frame, current is used to represent the current frame, i is used to represent a serial number of a line segment endpoint, $L_{current}^{x_i}$ represents a horizontal coordinate of the line segment endpoint i in the current frame, current $L_{current}^{y_i}$ represents a vertical coordinate of the line segment endpoint i in the current frame, $L_{pre}^{x_i}$ represents a horizontal coordinate of the line segment endpoint i in the previous frame, and $L_{pre}^{y_i}$ represents a vertical coordinate of the line segment endpoint i in the previous frame.

In addition, a distance between each line segment detected in the first frame and a frame line segment of the reference region may also be determined by the foregoing formula (1). In this case, coordinates of a line segment endpoint of the previous frame in the foregoing formula (1) may be replaced with endpoint coordinates of a frame line segment of the reference region, and details are not described again in this embodiment of this application.

Figure 7:
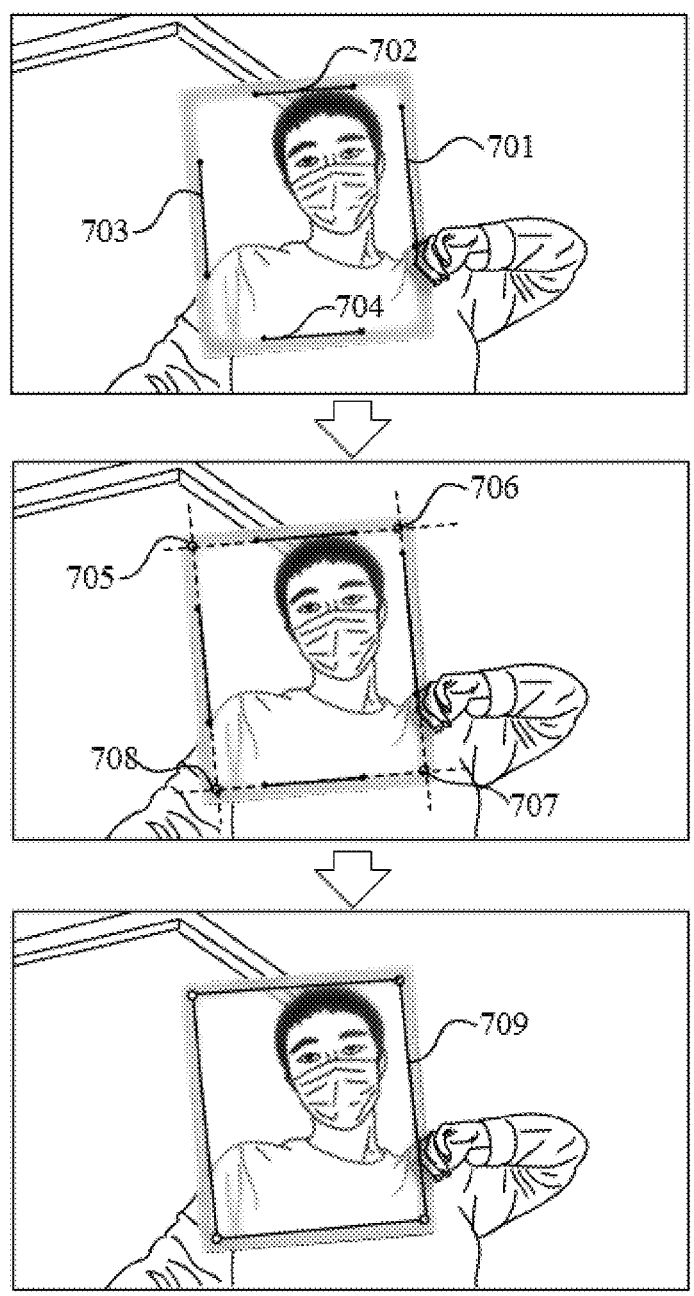
FIG. 7 is a schematic diagram of a method for determining a target sub-image according to an embodiment of this application.

In the foregoing process of determining the target sub-image, the target line segments closest to the frame of the reference region or the frame of the target sub-image in the previous frame are first obtained, at least three corners of the target sub-image in the current frame are then determined based on intersecting positions of extension lines of the target line segments, and the target sub-image in the current frame is located according to the determined at least three corners. FIG. 7 is a schematic diagram of a method for determining a target sub-image according to an embodiment of this application. The foregoing process of determining the target sub-image based on the target line segments is described below with reference to FIG. 7. In the application process of the photo frame transition effect, there is a case that the user holds the photo frame, causing the hand to block edges and corners of the photo frame. There is also a case that the photo frame is shaken and the photo frame is motion blurred, that is, the photo frame cannot be clearly displayed in the video frame picture. In this case, when the photo frame, that is, the boundary of the target sub-image is identified, only part of the line segments on the boundary of the target sub-image can be identified. As shown in FIG. 7, when the photo frame is motion blurred and blocked, when line segment detection is performed on the video frame, line segments 701, 702, 703, and 704 are detected, that is, part of the edge region of the photo frame is identified. In this embodiment of this application, corners 705, 706, 707 and 708 may be determined based on extension lines of the line segments 701, 702, 703, and 704. A target sub-image 709 may then be located according to the corners. For example, the corners are connected to enclose the target sub-image. In the application process of the photo frame transition effect, the method of determining the line segments first and then determining the corners of the target sub-image based on the extension lines of the line segments is used, which can determine all the corners of the target sub-image, thereby avoiding the cases that corners cannot be identified or locating of the target sub-image fails due to blocked corners of the target sub-image or blurred display in the photo frame transition process. When the two videos are subsequently merged, a case that the video picture of the second video cannot be completely displayed due to the incomplete target sub-image identified is avoided, thereby ensuring that the video frame picture of the second video has a good display effect.

Figure 8:
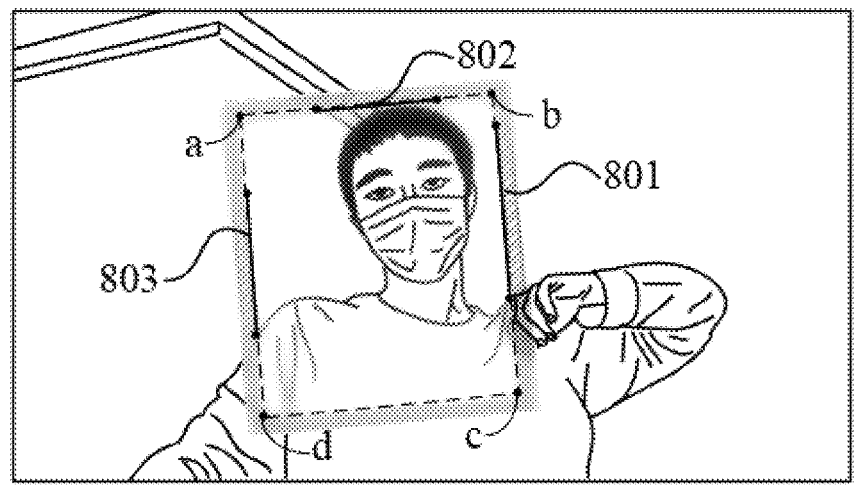
FIG. 8 is a schematic diagram of a video frame of a motion blur effect according to an embodiment of this application.

The foregoing steps 402 and 403 are the steps of determining the target sub-image in the plurality of video frames of the first video. In this embodiment of this application, the target sub-image in the current frame is predicted based on the target sub-image determined in the previous frame, and the target sub-image is detected frame by frame, to implement accurate tracking of the target sub-image without the need for the user to manually label the target sub-image frame by frame. When motion blur occurs in the first video, line segment detection is performed on the video frames of the first video. A part of the edge of the photo frame may be identified, while the other part cannot be identified. In this case, the target sub-image in the current frame is predicted based on an identification result of the previous frame, which can effectively improve the accuracy of identifying the target sub-image. That is, in the case of motion blur or blocking, the target sub-image can also be accurately tracked. For example, in the case of motion blur or blocking, an edge enclosing the target sub-image may be blocked. Taking FIG. 8 as an example, FIG. 8 is a schematic diagram of a video frame of a motion blur effect according to an embodiment of this application. Due to the motion blur caused by a photo frame of the video frame, when line segment detection is performed on the video frame, line segments 801, 802, and 803 are detected, and one edge of the photo frame cannot be identified. Therefore, a target sub-image cannot be identified according to the currently obtained line segments. In this case, the target sub-image in the current frame may be predicted with reference to the boundary of the target sub-image identified in the previous frame and the part of line segments identified in the current frame. For example, the server may first determine a corner a and a corner b according to extension lines of the line segments 801, 802, and 803. The server then extends the other endpoints of the line segments 801 and 803 according to a length of a frame line segment of the target sub-image closest to the line segment 801 or 803 in the previous frame, thereby obtaining the other two corners c and d. Finally, the foregoing four corners a, b, c, and d are connected to obtain the target sub-image in the current frame.

The foregoing steps 402 and 403 are a manner of detecting the target sub-image in the video frames provided in an embodiment of this application. In some embodiments, the server may alternatively detect the target sub-image in other manners. For example, instead of relying on the line segment detection manner, a target detection network is used to directly identify the target sub-image in each video frame based on region features of the target sub-image.

404: The server performs perspective transformation on the corresponding first video frames of the second video based on corner coordinates of the target sub-image included in the plurality of video frames of the first video, and performs the subsequent motion blur step based on the first video frames after the perspective transformation.

In some embodiments, the server determines a perspective transformation matrix corresponding to each video frame of the first video based on relative positions between the corner coordinates of the target sub-image included in the plurality of video frames of the first video; and respectively performs perspective transformation on the corresponding first video frames of the second video based on the perspective transformation matrix corresponding to each video frame of the first video. In an example in which an $i^{th}$ frame in the first video corresponds to a $j^{th}$ frame in the second video, the foregoing perspective transformation process may be expressed as the following formulas (2) and (3):

$$[x', y', w'] = [u, v, w] \begin{bmatrix} a_{11} & a_{12} & a_{13} \\ a_{21} & a_{22} & a_{23} \\ a_{31} & a_{32} & a_{33} \end{bmatrix}; \quad (2)$$

and $$x = \frac{x'}{w'} = \frac{a_{11}u + a_{21}v + a_{31}}{a_{13}u + a_{23}v + a_{33}} \quad (3)$$

$$y = \frac{y'}{w'} = \frac{a_{12}u + a_{22}v + a_{32}}{a_{13}u + a_{23}v + a_{33}};$$

where a11, a12, a13, a21, a22, a23, a31, a32, and a33 are parameters of the perspective transformation matrix, and values of the parameters are determined based on coordinates of corners of the target sub-image included in the $i^{th}$ frame in the first video, and this is not limited in the embodiments of this application. u and v represent original horizontal and vertical coordinates of each pixel in the $j^{th}$ frame of the second video, and w may be set to 1. x and y represent horizontal and vertical coordinates of each pixel in the $j^{th}$ frame of the second video after perspective transformation. x' and y' represent middle horizontal and vertical coordinates of each pixel in the $j^{th}$ frame of the second video during the perspective transformation. w' represents a vertical coordinate of a pixel in the three-dimensional space. In the foregoing process, the server first maps the two-dimensional coordinates (u, v) to the three-dimensional space to obtain (x', y', w'), which is then mapped to the two-dimensional space to obtain (x, y), to complete the perspective transformation. The foregoing description of the perspective transformation method is merely an exemplary description. The method used for performing perspective transformation on the video frames of the second video is not limited in this embodiment of this application.

In this embodiment of this application, when the photo frame in the first video moves, the photo frame may be perspective due to different distances between the corners and the lens. In this case, a perspective status of the photo frame is determined based on a relative position relationship between the corners in the identified target sub-image. Before the second video is embedded into the first video, perspective transformation is performed on the video frames of the second video based on the perspective status of the photo frame in the first video, so that the second video can be better fused with the first video. Therefore, the synthesized video is more realistic, and a good video transition effect is displayed.

405: The server obtains position movement of the target sub-image in every two adjacent video frames of the first video, and determines region movement information of the target sub-image based on the position movement.

In this embodiment of this application, when the target sub-image moves, movement distances and movement directions of the corners of the target sub-image may be different. Based on this, the region movement information of the target sub-image includes movement information corresponding to the corners of the target sub-image. That is, the region movement information includes the movement distances and the movement directions of the corners of the target sub-image.

Figure 9:
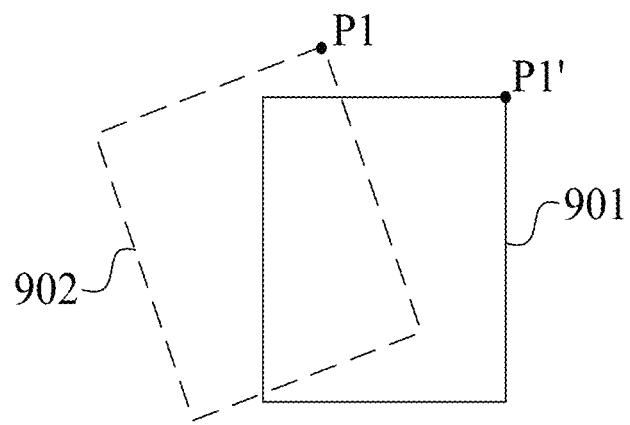
FIG. 9 is a schematic diagram of a movement status of a target sub-image according to an embodiment of this application.

In some embodiments, the server may determine, based on a change of position coordinates of each corner in two adjacent video frames, a movement distance and a movement direction of the corner. FIG. 9 is a schematic diagram of a movement status of a target sub-image according to an embodiment of this application. FIG. 9 shows a position 901 of a target sub-image in an $i^{th}$ frame of a first video and a position 902 of the target sub-image in an $(i-1)^{th}$ frame of the first video. During the movement of the target sub-image, movement magnitudes of corners are different. For example, a corner at a position p1 in the $(i-1)^{th}$ frame moves to a position p1' in the $i^{th}$ frame. Taking obtaining a movement distance and a movement direction of a corner as an example, the foregoing process may be expressed as the following formulas (4) and (5):

$$k = p\sqrt{(X_{current} - X_{pre})^2 + (Y_{current} - Y_{pre})^2} \; ; \quad (4)$$

and $$\cos\theta = \frac{|X_{current} - X_{pre}|}{\sqrt{(X_{current} - X_{pre})^2 + (Y_{current} - Y_{pre})^2}}, \quad (5)$$

where $X_{current}$ and $Y_{current}$ respectively represent horizontal and vertical coordinates of the corner in the current frame, and $X_{pre}$ and $_{pre}$ respectively represent horizontal and vertical coordinates of the corner in the previous frame; k represents the movement distance of the corner; cos θ represents the movement direction of the corner; and p represents a regulatory factor, whose value may be set by the developer, and this is not limited in the embodiments of this application.

The foregoing steps 402, 403, and 405 are the steps of determining region movement information of a plurality of video frames of the first video, where the region movement information include region movement information of the target sub-image in every two adjacent video frames of the plurality of video frames. In this embodiment of this application, the subsequent motion blur processing is performed on the second video based on position movement of the photo frame in every two adjacent video frames, so that the fusion effect of the second video and the first video is more natural.

406: The server performs motion blur processing on a plurality of first video frames of the second video based on the region movement information of the plurality of video frames of the first video, to obtain a plurality of second video frames of the second video.

In some embodiments, the server may perform a convolution operation on the first video frames of the second video by using a convolution module, to implement motion blur processing. The method may include the following steps:

Step 1: The server determines at least three groups of convolution parameters based on movement distances and movement directions of at least three corners of the target sub-image in the $i^{th}$ frame and the $(i-1)^{th}$ frame of the first video.

One group of convolution parameters may be determined based on a movement distance and a movement direction of one corner. The convolution parameters are used for indicating a size of a convolution region in one convolution operation and a movement direction of a convolution kernel. The movement distance of the corner may represent the size of the convolution region of the convolution kernel, and the size of the convolution region is positively correlated with a motion blur radius. The movement direction of the corner may represent the movement direction of the convolution kernel.

Step 2: The server performs a convolution operation on a first video frame of the second video corresponding to the $i^{th}$ frame by using a third convolution kernel based on the at least three groups of convolution parameters, to obtain at least three intermediate frames.

In some embodiments, the convolution module may be provided with a plurality of candidate convolution kernels of different scales, and the candidate convolution kernels of different scales correspond to convolution regions of different scales, that is, correspond to different movement distance value ranges. The server may select, from a plurality of candidate convolution kernels of different sizes, a candidate convolution kernel whose size matches the size of the convolution region in each group of convolution parameters as the third convolution kernel corresponding to each group of convolution parameters; and perform a convolution operation on the first video frame of the second video corresponding to the $i^{th}$ frame according to a movement direction in the corresponding group of convolution parameters by using the third convolution kernel corresponding to each group of convolution parameters, to obtain the at least three intermediate video frames. For example, in a group of convolution parameters, the size of the convolution region is 3*3, and the server may select a candidate convolution kernel of 3*3 as the third convolution kernel. In some embodiments, a third convolution kernel of a scale may also be set in the convolution module, and the server adjusts the convolution region of the third convolution kernel after obtaining convolution parameters. In an example in which the convolution operation is to obtain an average of elements in a convolution region, if a convolution region in a group of convolution parameters is 5*5, when using the third convolution kernel to perform a convolution operation on a target pixel, the server may use the target pixel as a center, and average elements in a region of 5*5 around the target pixel. The manner used for adjusting the convolution region during the convolution operation is not limited in this embodiment of this application.

Figure 10:
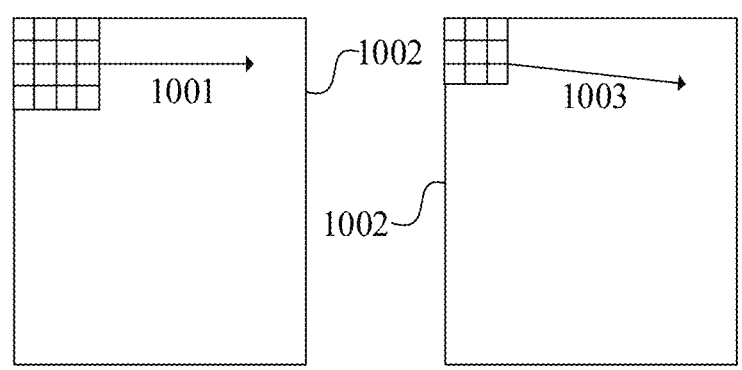
FIG. 10 is a schematic diagram of motion blur processing according to an embodiment of this application.
Figure 11:
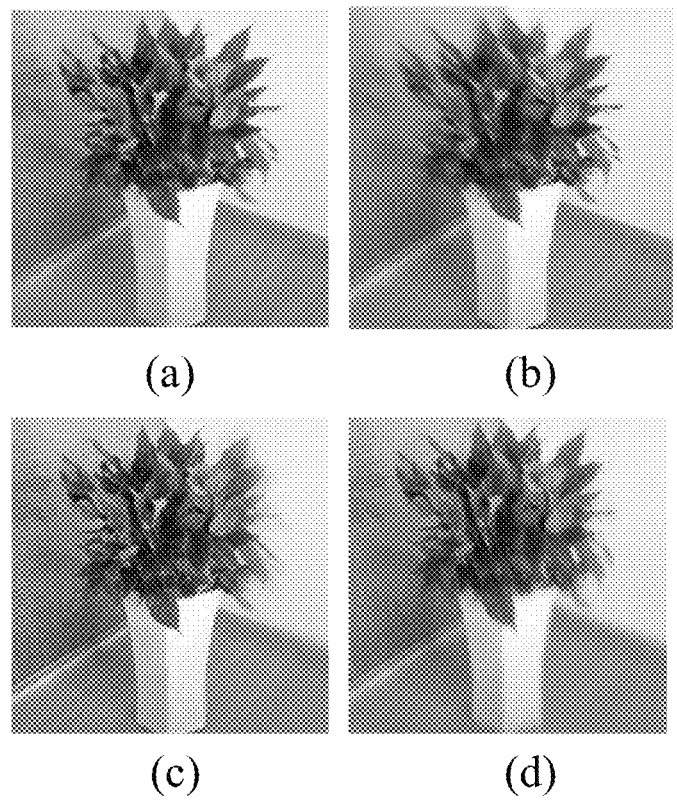
FIG. 11 is a schematic diagram of a motion blur effect according to an embodiment of this application.

The foregoing process of obtaining the intermediate frames is described by taking an example in which an $i^{th}$ frame in the first video corresponds to a $j^{th}$ frame in the second video. After at least three groups of convolution parameters are determined according to region movement information of the target sub-image between the $(i-1)^{th}$ frame and the $i^{th}$ frame of the first video, the server performs a convolution operation on the $j^{th}$ frame of the second video based on each group of convolution parameters by using the third convolution kernel, to obtain at least three intermediate frames corresponding to the $j^{th}$ frame. FIG. 10 is a schematic diagram of motion blur processing according to an embodiment of this application. The foregoing process of obtaining the intermediate frames is described by taking FIG. 10 as an example. Referring to FIG. 10, if a corner A in a target sub-image corresponds to a first group of convolution parameters, a size of a convolution region in the first group of convolution parameters is 4*4, and a convolution direction is the 1001 direction, when the server performs the convolution operation based on the first group of convolution parameters, the third convolution kernel starts from the upper left of a video frame 1002 of the second video, and the convolution operation is performed according to the size of the convolution region and the convolution direction indicated by the first group of convolution parameters, to obtain an intermediate frame. If a corner B in the target sub-image corresponds to a second group of convolution parameters, a size of a convolution region in the second group of convolution parameters is 3*3, and a convolution direction is the 1003 direction, when the server performs the convolution operation based on the second group of convolution parameters, the third convolution kernel starts from the upper left of the video frame 1002, and the convolution operation is performed according to the size of the convolution region and the convolution direction indicated by the second group of convolution parameters, to obtain another intermediate frame. FIG. 11 is a schematic diagram of a motion blur effect according to an embodiment of this application. After the convolution operation is respectively performed on the video frames of the second video according to a group of convolution parameters corresponding to each of the four corners of the target sub-image, the four intermediate frames obtained have different motion blur effects, as shown in figures (a), (b), (c), and (d) in FIG. 11.

Step 3: The server superimposes the at least three intermediate frames to obtain a second video frame of the second video corresponding to the $i^{th}$ frame of the first video.

In some embodiments, the server determines a transparency parameter corresponding to each of the intermediate frames at each pixel based on a distance of each pixel of the $i^{th}$ frame of the first video relative to each corner; and superimposes corresponding pixels in the at least three intermediate frames based on the transparency parameter corresponding to each of the intermediate frames at each pixel, to obtain the second video frame of the second video corresponding to the $i^{th}$ frame. For example, for a pixel t of the $j^{th}$ frame in the second video, the server obtains a distance between the pixel t and each corner. For example, the $j^{th}$ frame of the second video corresponds to the $i^{th}$ frame of the first video. The server may place the $j^{th}$ frame of the second video in the target sub-image of the $i^{th}$ frame in the first video, and then determine the distance between the pixel t and each corner. Based on the distance between the pixel t and each corner, the server determines a transparency parameter corresponding to each intermediate frame at the pixel t. For example, the server performs the convolution operation based on the convolution parameters corresponding to the corner A to obtain an intermediate frame a. in this case, a transparency parameter corresponding to the intermediate frame a is positively correlated with a distance between the pixel t and the corner A. That is, a larger distance between the pixel t and the corner A indicates higher transparency of the intermediate frame a at the pixel t, and a smaller distance between the pixel t and the corner A indicates lower transparency of the intermediate frame a at the pixel t. At the pixel t, the server superimposes pixel values at the pixel t in the at least three intermediate frames based on the transparency parameter corresponding to each intermediate frame, to obtain a new pixel. Based on the foregoing process, a new pixel corresponding to each pixel in the $j^{th}$ frame of the second video is obtained, and the $j^{th}$ frame after the motion blur processing is obtained, that is, the second video frame of the second video corresponding to the $i^{th}$ frame is obtained.

The foregoing description of the method for performing motion blur processing on the video frames is merely an exemplary description. The manner used for performing motion blur processing on the video frames is not limited in this embodiment of this application. In this embodiment of this application, motion blur processing is performed on the video frames of the second video, so that the display effect of the second video matches the display effect of the first video, to obtain a more natural video transition effect. In addition, by using the foregoing motion blur processing method, it is not necessary to perform different degrees of motion blur processing on each pixel in the video frames. Only the transparency of the intermediate frames needs to be adjusted. The intermediate frames with different transparency are superimposed, which greatly reduces the computation amount during the motion blur processing.

407: The server embeds the second video into the first video by replacing the target sub-image in the plurality of video frames of the first video with the corresponding second video frames of the second video to obtain a target video.

Figure 12:
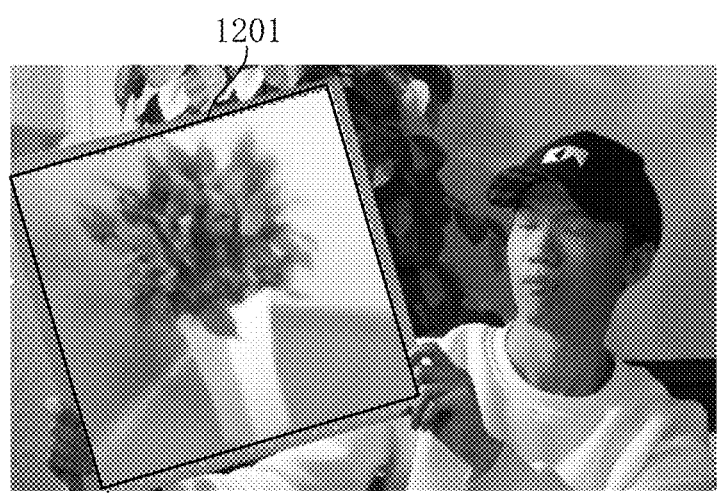
FIG. 12 is a schematic diagram of a video frame of a target video according to an embodiment of this application.

In an example in which the $i^{th}$ frame of the first video corresponds to the $j^{th}$ frame of the second video, the server may replace the target sub-image in the $i^{th}$ frame of the first video with the $j^{th}$ frame of the second video after the motion blur processing, to obtain a video frame of the target video. FIG. 12 is a schematic diagram of a video frame of a target video according to an embodiment of this application. As shown in FIG. 12, a target sub-image 1201 is replaced with an image after motion blur processing. After the target sub-image is replaced, a target video can be obtained, that is, a target video to which a photo frame transition effect is added. In some embodiments, the server may send the target video to the terminal, and the terminal plays the target video.

Figure 13:
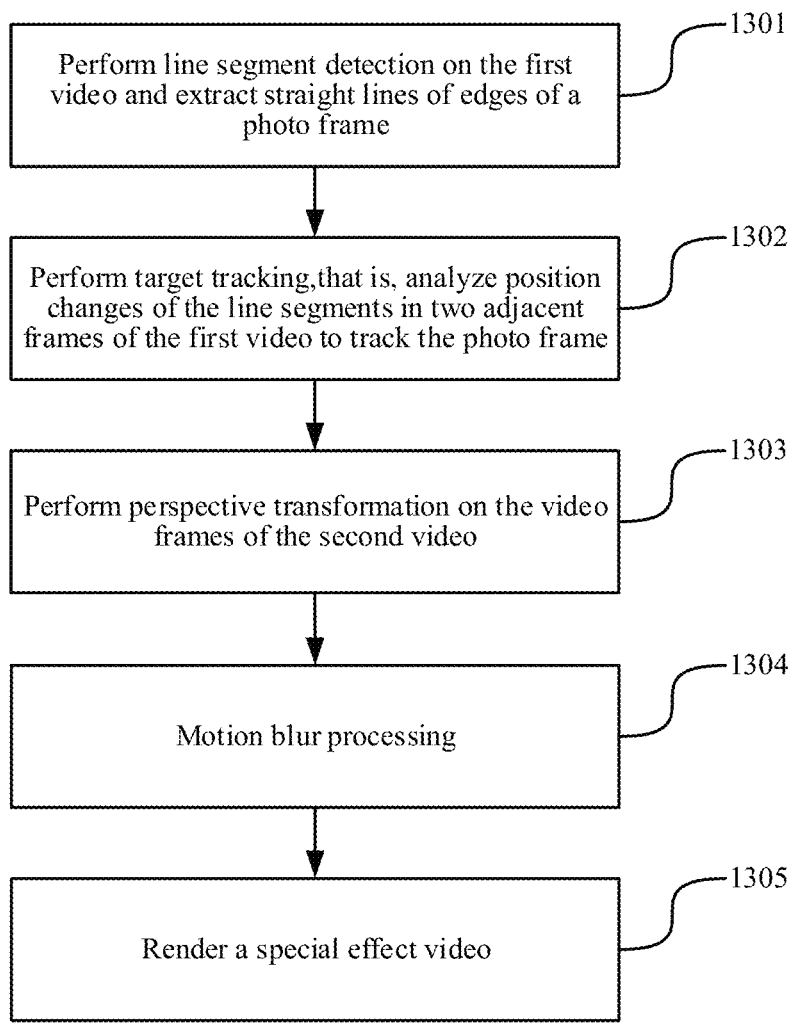
FIG. 13 is a flowchart of a method for implementing a photo frame transition effect according to an embodiment of this application.
Figure 14:
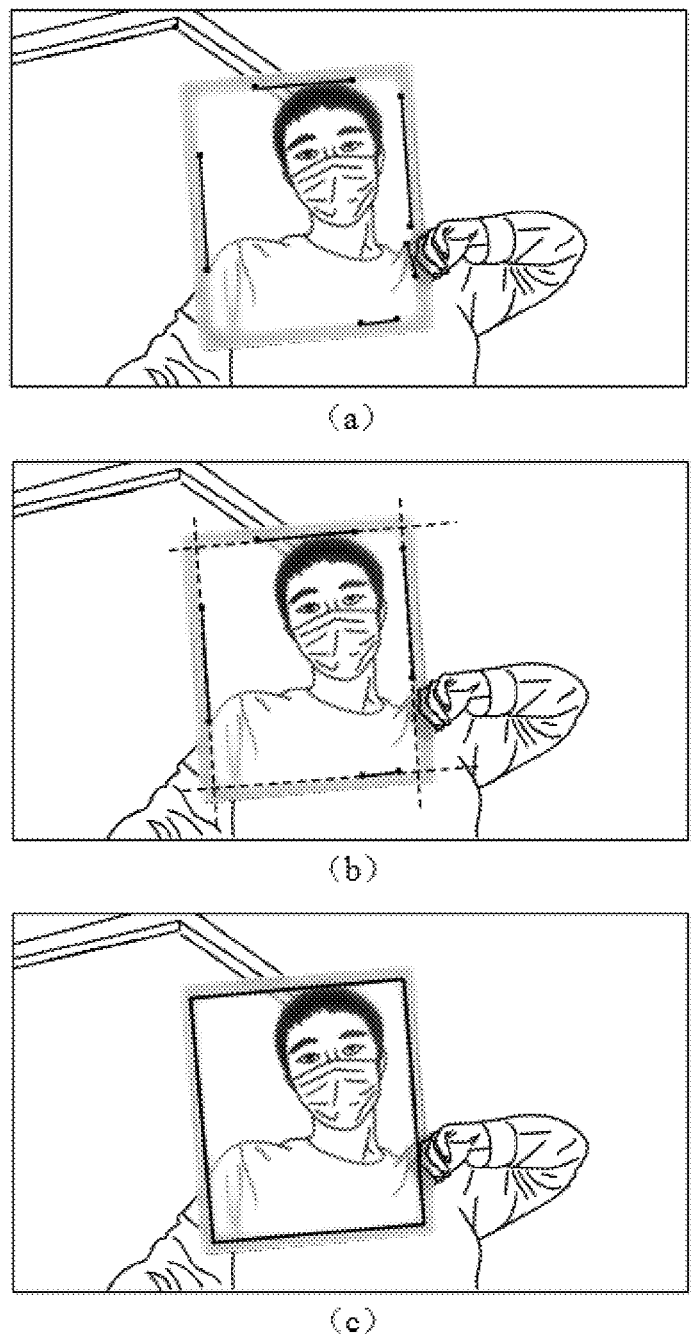
FIG. 14 is a schematic diagram of a process of tracking a target sub-image according to an embodiment of this application.

FIG. 13 is a flowchart of a method for implementing a photo frame transition effect according to an embodiment of this application. The foregoing video data processing process is described with reference to FIG. 13. In some embodiments, after obtaining a first video and a second video to be processed, the server first performs step 1301 of performing line segment detection on the first video and extracting straight lines of edges of a photo frame; and then performs step 1302 of target tracking according to detected line segments. That is, position changes of the line segments in two adjacent frames of the first video are analyzed to track the photo frame. That is, the target sub-image is tracked. The process of determining the target sub-image is shown in FIG. 14. FIG. 14 is a schematic diagram of a process of tracking a target sub-image according to an embodiment of this application. Specifically, in the line segment detection stage, the server detects all the line segments in the current frame of the first video, as shown in figure (a) in FIG. 14, screens out target line segments in the current frame according to a target sub-image determination result of the previous frame, and then determines the target sub-image according to the target line segments or extension lines of the target line segments, as shown in figure (b) in FIG. 14. The obtained target sub-image is shown in figure (c) in FIG. 14. The foregoing process of tracking the target sub-image is the process of steps 402 and 403. After determining the target sub-image, that is, the image framed by the photo frame, the server extracts perspective information of the photo frame, and performs step 1303 of performing perspective transformation on the video frames of the second video, that is, performs the content in the foregoing step 404; performs step 1304 of motion blur processing on the video frames in the second video after perspective transformation, so that the second video and the first video maintain the same motion blur effect, that is, performs the foregoing steps 405 and 406; and synthesizes the second video and the first video after the motion blur processing, that is, performs step 1305 of rendering a special effect video, to obtain a target video to which the photo frame transition effect is added.

In addition, in the foregoing embodiments, the embodiments of this application are mainly described by taking an example in which the target sub-image is the image framed by the photo frame. In some embodiments, the target sub-image in the plurality of video frames of the first video may be alternatively an image in a region in other shapes, such as triangles, pentagons, circles, ellipses, or other irregular shapes. In this case, the manner of detecting the target sub-image may be selected according to the shape enclosed by the boundary of the target sub-image. Moreover, when the target sub-image does not have obvious corners, some feature points on the boundary of the target sub-image may be selected as corners, and then motion blur processing is performed on the plurality of video frames in the second video through the foregoing steps 404 to 406.

In the technical solutions provided in the embodiments of this application, when the target sub-image of the first video is replaced with the second video to embed the second video into the first video, the position movement of the target sub-image in the first video is obtained based on an artificial intelligence technology. According to the position movement, motion blur processing is performed on the picture of the second video correspondingly, so that the second video and the first video have the same motion blur effect. Therefore, the first video and the second video can be better fused, and a better video transition effect can be obtained.

All the foregoing exemplary technical solutions may be arbitrarily combined to form an exemplary embodiment of this application, and details are not described herein again.

Figure 15:
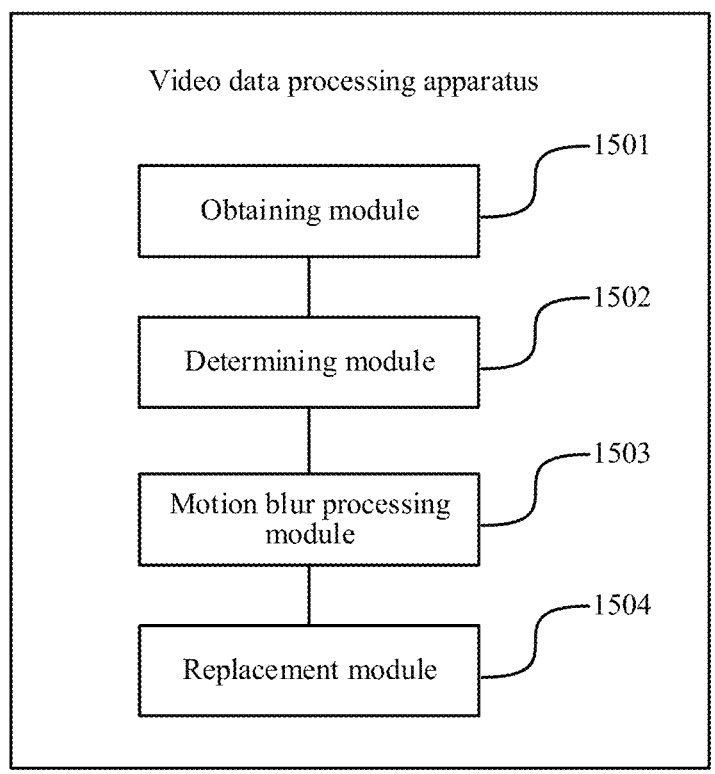
FIG. 15 is a schematic structural diagram of a video data processing apparatus according to an embodiment of this application.

FIG. 15 is a schematic structural diagram of a video data processing apparatus according to an embodiment of this application. Referring to FIG. 15, the apparatus includes:

an obtaining module 1501, configured to obtain a first video and a second video to be processed;

a determining module 1502, configured to determine region movement information of a plurality of video frames of the first video, the region movement information being used for indicating position movement of a target sub-image in every two adjacent video frames of the plurality of video frames of the first video;

a motion blur processing module 1503, configured to perform motion blur processing on a plurality of first video frames of the second video based on the region movement information of the plurality of video frames of the first video, to obtain a plurality of second video frames of the second video; and a replacement module 1504, configured to replace the target sub-image in the plurality of video frames of the first video with the corresponding second video frames of the second video to obtain a target video.

In some embodiments, the determining module 1502 includes:

a first determining unit, configured to determine the target sub-image in the plurality of video frames of the first video; and a second determining unit, configured to determine the region movement information based on the position movement of the target sub-image in every two adjacent video frames of the plurality of video frames of the first video.

In some embodiments, the first determining unit includes:

a detection subunit, configured to perform line segment detection on the plurality of video frames of the first video; and a region determining subunit, configured to determine the target sub-image included in the plurality of video frames of the first video based on detected line segments.

In some embodiments, the detection subunit includes:

a feature extraction subunit, configured to perform feature extraction on each video frame of the first video to obtain a feature map corresponding to the video frame;

a connection point determining subunit, configured to determine connection points included in the video frame based on the feature map corresponding to the video frame; and a line segment determining subunit, configured to determine line segments included in the video frame based on the connection points.

In some embodiments, the connection point determining subunit is configured to:

divide the feature map into a plurality of sub-regions;

perform a convolution operation on the sub-regions in the feature map based on a first convolution kernel to obtain a probability feature map, where an element in the probability feature map is used for indicating a probability that a connection point exists in a corresponding sub-region;

perform a convolution operation on the probability feature map based on a second convolution kernel to obtain a position feature map, where an element in the position feature map is used for indicating position information of a connection point in a corresponding sub-region; and determine the connection points included in the video frame based on the probability feature map and the position feature map.

In some embodiments, the region determining subunit is configured to:

obtain, from the line segments detected in a first frame of the first video, line segments closest to a frame of a reference region as target line segments, and determine an image in a region enclosed by the target line segments as the target sub-image; and obtain, from the line segments detected in an $i^{th}$ frame of the first video, line segments closest to target line segments in an $(i-1)^{th}$ frame as target line segments in the $i^{th}$ frame, and determine an image in a region enclosed by the target line segments in the $i^{th}$ frame as the target sub-image, where i is an integer greater than 1.

In some embodiments, the region movement information includes movement distances and movement directions of at least three corners of the target sub-image.

In some embodiments, the motion blur processing module 1503 includes:

a parameter determining unit, configured to respectively determine at least three groups of convolution parameters based on movement distances and movement directions of at least three corners of the target sub-image in the $i^{th}$ frame and the $(i-1)^{th}$ frame of the first video, where the convolution parameters are used for indicating a size of a convolution region of a third convolution kernel in one convolution operation and a movement direction of the third convolution kernel;

a convolution unit, configured to perform a convolution operation on a first video frame of the second video corresponding to the $i^{th}$ frame by using a third convolution kernel based on the at least three groups of convolution parameters, to obtain at least three intermediate frames; and a superimposing unit, configured to superimpose the at least three intermediate frames to obtain a second video frame of the second video corresponding to the $i^{th}$ frame.

In some embodiments, the convolution unit is configured to:

select, from a plurality of candidate convolution kernels of different sizes, a candidate convolution kernel whose size matches the size of the convolution region in each group of convolution parameters as the third convolution kernel corresponding to each group of convolution parameters; and perform a convolution operation on the first video frame of the second video corresponding to the $i^{th}$ frame according to a movement direction in the corresponding group of convolution parameters by using the third convolution kernel corresponding to each group of convolution parameters, to obtain the at least three intermediate video frames.

In some embodiments, the superimposing unit is configured to:

determine a transparency parameter corresponding to each of the intermediate frames at each pixel based on a distance of each pixel of the $i^{th}$ frame of the first video relative to each corner; and superimpose corresponding pixels in the at least three intermediate frames based on the transparency parameter corresponding to each of the intermediate frames at each pixel, to obtain the second video frame of the second video corresponding to the $i^{th}$ frame.

In some embodiments, the apparatus further includes:

a perspective transformation module, configured to respectively perform perspective transformation on the corresponding first video frames of the second video based on corner coordinates of the target sub-image included in the plurality of video frames of the first video, and perform, based on the first video frames of the second video after the perspective transformation, the operation of performing motion blur processing on the plurality of first video frames of the second video based on the region movement information of the plurality of video frames of the first video.

In some embodiments, the perspective transformation module is configured to:

determine a perspective transformation matrix corresponding to each video frame of the first video based on relative positions between the corner coordinates of the target sub-image included in the plurality of video frames of the first video; and respectively perform perspective transformation on the corresponding first video frames of the second video based on the perspective transformation matrix corresponding to each video frame of the first video.

According to the apparatus provided in the embodiments of this application, when the target sub-image of the first video is replaced with the second video to embed the second video into the first video, the position movement of the target sub-image in the first video is obtained based on an artificial intelligence technology. According to the position movement, motion blur processing is performed on the picture of the second video correspondingly, so that the second video and the first video have the same motion blur effect. Therefore, the first video and the second video can be better fused, and a better video transition effect can be obtained.

When the video data processing apparatus provided in the foregoing embodiment processes video data, division of the foregoing functional modules is merely an example for description. In an actual application, the foregoing functions may be assigned to and completed by different modules as needed, that is, the internal structure of the apparatus is divided into different functional modules to implement all or some of the functions described above. In addition, the video data processing apparatus provided in the foregoing embodiment belongs to the same concept as the embodiments of the video data processing method. For a specific implementation process of the apparatus, reference may be made to the method embodiment, and details are not described herein again.

The video data processing method described above is performed by a computer device, where the computer device may be a terminal or a server. When the computer device is a terminal, the method may be implemented by a terminal shown in FIG. 16 below.

Figure 16:
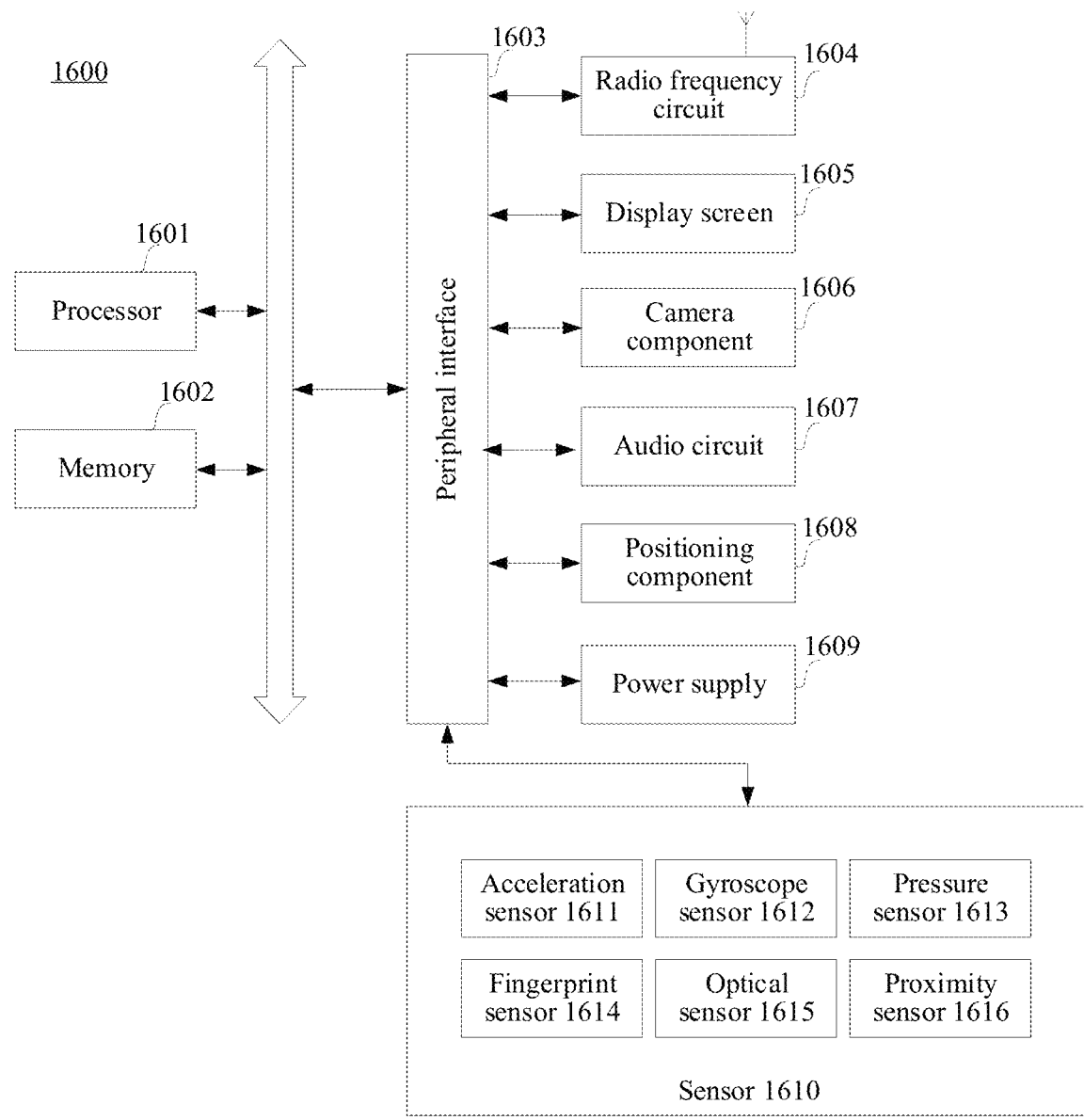
FIG. 16 is a schematic structural diagram of a terminal according to an embodiment of this application.

FIG. 16 is a schematic structural diagram of a terminal according to an embodiment of this application. The terminal 1600 may be a smartphone, a tablet computer, a Moving Picture Experts Group Audio Layer III (MP3) player, a Moving Picture Experts Group Audio Layer IV (MP4) player, a notebook computer, or a desktop computer. The terminal 1600 may also be referred to another name such as user equipment, a portable terminal, a laptop terminal, or a desktop terminal.

Generally, the terminal 1600 includes one or more processors 1601 and one or more memories 1602.

The processor 1601 may include one or more processing cores, for example, a 4-core processor or an 8-core processor. The processor 1601 may be implemented in at least one hardware form of a digital signal processor (DSP), a field-programmable gate array (FPGA), or a programmable logic array (PLA). The processor 1601 may alternatively include a main processor and a coprocessor. The main processor is configured to process data in an awake state, also referred to as a central processing unit (CPU). The coprocessor is a low-power processor configured to process data in a standby state. In some embodiments, the processor 1601 may be integrated with a graphics processing unit (GPU). The GPU is configured to render and draw content that needs to be displayed on a display screen. In some embodiments, the processor 1601 may further include an artificial intelligence (AI) processor. The AI processor is configured to process a computing operation related to machine learning.

The memory 1602 may include one or more computer-readable storage media. The computer-readable storage media may be non-transient. The memory 1602 may further include a high-speed random access memory and a non-volatile memory, for example, one or more disk storage devices or flash memory devices. In some embodiments, a non-transient computer-readable storage medium in the memory 1602 is configured to store at least one program code, and the at least one program code is configured to be executed by the processor 1601 to implement the video data processing method provided in the method embodiments of this application.

In some embodiments, the terminal 1600 may include: a peripheral interface 1603 and at least one peripheral. The processor 1601, the memory 1602, and the peripheral interface 1603 may be connected through a bus or a signal cable. Each peripheral may be connected to the peripheral interface 1603 through a bus, a signal cable, or a circuit board. Specifically, the peripheral includes: at least one of a radio frequency circuit 1604, a display screen 1605, a camera component 1606, an audio circuit 1607, a positioning component 1608, and a power supply 1609.

The peripheral interface 1603 may be configured to connect the at least one peripheral related to input/output (I/O) to the processor 1601 and the memory 1602. In some embodiments, the processor 1601, the memory 1602, and the peripheral interface 1603 are integrated on the same chip or the same circuit board. In some other embodiments, any or two of the processor 1601, the memory 1602, and the peripheral interface 1603 may be implemented on an independent chip or circuit board. This is not limited in this embodiment.

The radio frequency circuit 1604 is configured to receive and transmit a radio frequency (RF) signal, which is also referred to as an electromagnetic signal. The radio frequency circuit 1604 communicates with a communication network and other communication devices through the electromagnetic signal. The radio frequency circuit 1604 converts an electric signal into an electromagnetic signal for transmission, or converts a received electromagnetic signal into an electric signal. In some embodiments, the radio frequency circuit 1604 includes: an antenna system, an RF transceiver, one or more amplifiers, a tuner, an oscillator, a digital signal processor, a codec chip set, a subscriber identity module card, and the like. The radio frequency circuit 1604 may communicate with another terminal by using at least one wireless communication protocol. The wireless communication protocol includes, but is not limited to, a metropolitan area network, different generations of mobile communication networks (2G, 3G, 4G, and 5G), a wireless local area network, and/or a wireless fidelity (Wi-Fi) network. In some embodiments, the radio frequency circuit 1604 may further include a circuit related to near field communication (NFC). This is not limited in this application.

The display screen 1605 is configured to display a user interface (UI). The UI may include graphics, text, icons, videos, and any combination thereof. When the display screen 1605 is a touch display screen, the display screen 1605 is further capable of acquiring touch signals on or above a surface of the display screen 1605. The touch signal may be used as a control signal to be inputted to the processor 1601 for processing. In this case, the display screen 1605 may be further configured to provide a virtual button and/or a virtual keyboard that are/is also referred to as a soft button and/or a soft keyboard. In some embodiments, there may be one display screen 1605, disposed on a front panel of the terminal 1600. In some other embodiments, there may be at least two display screens 1605 that are respectively disposed on different surfaces of the terminal 1600 or folded. In some embodiments, the display screen 1605 may be a flexible display screen disposed on a curved surface or a folded surface of the terminal 1600. Even, the display screen 1605 may be further configured to have a non-rectangular irregular graph, that is, a special-shaped screen. The display screen 1605 may be manufactured by using a material such as a liquid crystal display (LCD) or an organic light-emitting diode (OLED).

The camera component 1606 is configured to acquire an image or a video. In some embodiments, the camera component 1606 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to implement background blur through fusion of the main camera and the depth-of-field camera, panoramic photographing and virtual reality (VR) photographing through fusion of the main camera and the wide-angle camera, or other fusion photographing functions. In some embodiments, the camera component 1606 may further include a flash. The flash may be a single color temperature flash or a double color temperature flash. The double color temperature flash refers to a combination of a warm light flash and a cold light flash, and may be used for light compensation under different color temperatures.

The audio circuit 1607 may include a microphone and a speaker. The microphone is configured to acquire sound waves of a user and an environment, and convert the sound waves into electrical signals and input the electrical signals into the processor 1601 for processing, or input the electrical signals into the radio frequency circuit 1604 to implement speech communication. For a purpose of stereo collection or noise reduction, there may be a plurality of microphones disposed at different portions of the terminal 1600 respectively. The microphone may be alternatively an array microphone or an omni-directional collection type microphone. The speaker is configured to convert electrical signals from the processor 1601 or the radio frequency circuit 1604 into sound waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1607 may further include an earphone jack.

The positioning component 1608 is configured to determine a current geographic location of the terminal 1600, to implement a navigation or a location based service (LBS). The positioning component 1608 may be a positioning component based on the global positioning system (GPS) of the United States, a the BeiDou Navigation Satellite System (BDS) of China, the GLONASS System of Russia, or the GALILEO System of the European Union.

The power supply 1609 is configured to supply power to components in the terminal 1600. The power supply 1609 may be an alternating current, a direct current, a primary battery, or a rechargeable battery. When the power supply 1609 includes the rechargeable battery, the rechargeable battery may be a wired rechargeable battery or a wireless rechargeable battery. The rechargeable battery may be further configured to support a fast charge technology.

In some embodiments, the terminal 1600 further includes one or more sensors 1610. The one or more sensors 1610 include, but are not limited to, an acceleration sensor 1611, a gyroscope sensor 1612, a pressure sensor 1613, a fingerprint sensor 1614, an optical sensor 1615, and a proximity sensor 1616.

The acceleration sensor 1611 may detect the magnitude of acceleration on three coordinate axes of a coordinate system established with the terminal 1600. For example, the acceleration sensor 1611 may be configured to detect a component of gravity acceleration on the three coordinate axes. The processor 1601 may control, according to a gravity acceleration signal acquired by the acceleration sensor 1611, the display screen 1605 to display the user interface in a frame view or a portrait view. The acceleration sensor 1611 may be further configured to acquire motion data of a game or a user.

The gyroscope sensor 1612 may detect a body direction and a rotation angle of the terminal 1600. The gyroscope sensor 1612 may cooperate with the acceleration sensor 1611 to acquire a 3D action by the user on the terminal 1600. The processor 1601 may implement the following functions according to the data acquired by the gyroscope sensor 1612: motion sensing (such as changing the UI according to a tilt operation of the user), image stabilization during shooting, game control, and inertial navigation.

The pressure sensor 1613 may be disposed at a side frame of the terminal 1600 and/or a lower layer of the display screen 1605. When the pressure sensor 1613 is disposed at the side frame of the terminal 1600, a holding signal of the user on the terminal 1600 may be detected. The processor 1601 performs left and right hand recognition or a quick operation according to the holding signal acquired by the pressure sensor 1613. When the pressure sensor 1613 is disposed on the low layer of the display screen 1605, the processor 1601 controls, according to a pressure operation of the user on the display screen 1605, an operable control on the UI. The operable control includes at least one of a button control, a scroll-bar control, an icon control, and a menu control.

The fingerprint sensor 1614 is configured to acquire a fingerprint of a user, and the processor 1601 recognizes an identity of the user according to the fingerprint acquired by the fingerprint sensor 1614, or the fingerprint sensor 1614 recognizes the identity of the user according to the acquired fingerprint. When identifying that the identity of the user is a trusted identity, the processor 1601 authorizes the user to perform related sensitive operations. The sensitive operations include: unlocking a screen, viewing encryption information, downloading software, paying and changing a setting, and the like. The fingerprint sensor 1614 may be disposed on a front surface, a back surface, or a side surface of the terminal 1600. When a physical button or a vendor logo is disposed on the terminal 1600, the fingerprint 1614 may be integrated with the physical button or the vendor logo.

The optical sensor 1615 is configured to acquire ambient light intensity. In an embodiment, the processor 1601 may control display brightness of the display screen 1605 according to the ambient light intensity collected by the optical sensor 1615. Specifically, when the ambient light intensity is relatively high, the display brightness of the display screen 1605 is increased; and when the ambient light intensity is relatively low, the display brightness of the display screen 1605 is reduced. In another embodiment, the processor 1601 may further dynamically adjust a camera parameter of the camera component 1606 according to the ambient light intensity collected by the optical sensor 1615.

The proximity sensor 1616, also referred to as a distance sensor, is usually disposed on a front panel of the terminal 1600. The proximity sensor 1616 is configured to acquire a distance between a user and the front surface of the terminal 1600. In an embodiment, when the proximity sensor 1616 detects that a distance between the user and the front surface of the terminal 1600 is gradually reduced, the processor 1601 controls the display screen 1605 to be switched from a bright screen state to a rest screen state; and when the proximity sensor 1616 detects the distance between the user and the front surface of the terminal 1600 is gradually increased, the processor 1601 controls the touch display screen 1605 to be switched from the rest screen state to the bright screen state.

A person skilled in the art may understand that the structure shown in FIG. 16 constitutes no limitation on the terminal 1600, and the terminal may include more or fewer components than those shown in the figure, or combine some components, or use a different component deployment.

When the foregoing computer device for executing the video data processing method is a server, the server may be implemented by a server shown in FIG. 17 below.

Figure 17:
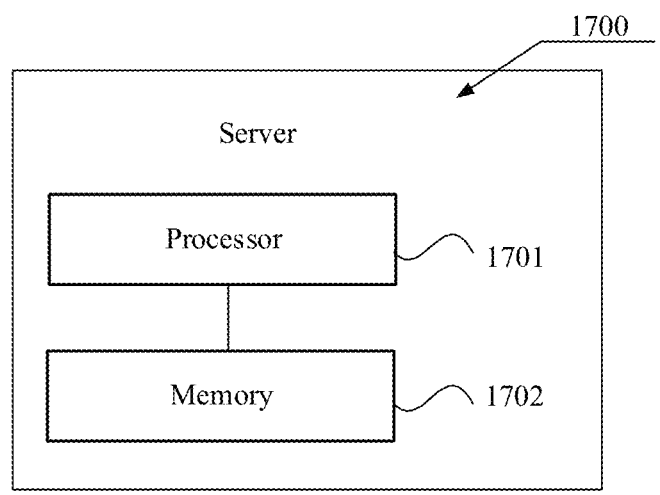
FIG. 17 is a schematic structural diagram of a server according to an embodiment of this application.

FIG. 17 is a schematic structural diagram of a server according to an embodiment of this application. The server 1700 may vary greatly because a configuration or performance varies, and may include one or more central processing units (CPU) 1701 and one or more memories 1702. The one or more memories 1702 store at least one program code, and the at least one program code is loaded and executed by the one or more processors 1701 to implement the methods provided in the foregoing various method embodiments. Certainly, the server 1700 may also have a wired or wireless network interface, a keyboard, an input/output interface and other components to facilitate input/output. The server 1700 may also include other components for implementing device functions. Details are not described herein.

In an exemplary embodiment, a computer-readable storage medium, for example, a memory including at least one program code is further provided. The at least one program code may be executed by a processor to implement the video data processing method in the foregoing embodiments. For example, the computer-readable storage medium may be a read-only memory (ROM), a random access memory (RAM), a compact disc ROM (CD-ROM), a magnetic tape, a floppy disk, or an optical data storage device.

In an exemplary embodiment, a computer program product is further provided, including at least one program code, the at least one program code being stored in a computer-readable storage medium. A processor of a computer device reads the at least one program code from the computer-readable storage medium, and executes the computer instructions, to cause the computer device to implement the operations performed in the video data processing method.

A person of ordinary skill in the art may understand that all or some of the steps of the foregoing embodiments may be implemented by using hardware, or may be implemented by at least one program code of a program instructing relevant hardware. The program may be stored in a computer-readable storage medium. The above-mentioned storage medium may be a ROM, a magnetic disk, an optical disc, or the like.

The foregoing descriptions are merely exemplary embodiments of this application, but are not intended to limit this application. Any modification, equivalent replacement, or improvement made within the spirit and principle of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A video data processing method performed by a computer device, the method comprising:
    obtaining a first video and a second video;
    identifying a target sub-image defined by a photo frame within each of a plurality of video frames of the first video;
    determining region movement information of the target sub-image between every two adjacent video frames in the plurality of video frames of the first video, the region movement information comprising movement distances and movement directions of at least three corners of the target sub-image between every two adjacent video frames and being used for defining position movement of the target sub-image between every two adjacent video frames in the plurality of video frames of the first video;

performing motion blur processing on a plurality of first video frames of the second video based on the region movement information of the target sub-image between every two adjacent video frames in the plurality of video frames of the first video, to obtain a plurality of second video frames of the second video, further comprising:

determining at least three groups of convolution parameters based on the movement distances and movement directions of the at least three corners of the target sub-image between the $i^{th}$ frame and the $(i-1)^{th}$ frame of the first video, wherein the convolution parameters are used for indicating a size of a convolution region in one convolution operation and a movement direction of a convolution kernel, and i is an integer greater than 1;

selecting, from a plurality of candidate convolution kernels of different sizes, a candidate convolution kernel whose size matches the size of the convolution region in each group of convolution parameters as a third convolution kernel;

performing a convolution operation on a first video frame of the second video corresponding to the $i^{th}$ frame according to a movement direction in the corresponding convolution parameters by using the third convolution kernel corresponding to each group of convolution parameters, to obtain at least three intermediate video frames; and superimposing the at least three intermediate frames to obtain a second video frame of the second video corresponding to the $i^{th}$ frame of the first video; and embedding the second video into the first video by replacing the target sub-image in the plurality of video frames of the first video with the corresponding second video frames of the second video to obtain a target video.

2. The method according to claim 1, wherein the determining region movement information of the target sub-image between every two adjacent video frames in the plurality of video frames of the first video comprises:

determining the target sub-image in the plurality of video frames of the first video; and determining the region movement information based on the position movement of the target sub-image between every two adjacent video frames in the plurality of video frames of the first video.

3. The method according to claim 2, wherein the determining the target sub-image in the plurality of video frames of the first video comprises:

performing line segment detection on the plurality of video frames of the first video; and determining the target sub-image comprised in the plurality of video frames of the first video based on detected line segments.

4. The method according to claim 3, wherein the performing line segment detection on the plurality of video frames of the first video comprises:

performing feature extraction on each video frame of the first video to obtain a feature map corresponding to the video frame;

determining connection points comprised in the video frame based on the feature map corresponding to the video frame; and determining line segments comprised in the video frame based on the connection points.

5. The method according to claim 4, wherein the determining connection points comprised in the video frame based on the feature map corresponding to the video frame comprises:

dividing the feature map into a plurality of sub-regions;

performing a convolution operation on the sub-regions in the feature map based on a first convolution kernel to obtain a probability feature map, wherein an element in the probability feature map is used for indicating a probability that a connection point exists in a corresponding sub-region;

performing a convolution operation on the probability feature map based on a second convolution kernel to obtain a position feature map, wherein an element in the position feature map is used for indicating position information of a connection point in a corresponding sub-region; and determining the connection points comprised in the video frame based on the probability feature map and the position feature map.

6. The method according to claim 3, wherein the determining the target sub-image comprised in the plurality of video frames of the first video based on detected line segments comprises:

obtaining, from the line segments detected in a first frame of the first video, line segments closest to a frame of a reference region as target line segments, and determining an image in a region enclosed by the target line segments as the target sub-image; and obtaining, from the line segments detected in an $i^{th}$ frame of the first video, line segments closest to target line segments in an $(i-1)^{th}$ frame as target line segments in the $i^{th}$ frame, and determining an image in a region enclosed by the target line segments in the $i^{th}$ frame as the target sub-image, wherein i is an integer greater than 1.

7. The method according to claim 1, wherein the superimposing the at least three intermediate frames to obtain a second video frame of the second video corresponding to the $i^{th}$ frame of the first video comprises:

determine a transparency parameter corresponding to each of the intermediate frames at each pixel based on a distance of each pixel of the $i^{th}$ frame of the first video relative to each corner; and superimposing corresponding pixels in the at least three intermediate frames based on the transparency parameter corresponding to each of the intermediate frames at each pixel, to obtain the second video frame of the second video corresponding to the $i^{th}$ frame of the first video.

8. The method according to claim 1, wherein before the performing motion blur processing on a plurality of first video frames of the second video based on the region movement information of the target sub-image between every two adjacent video frames in the plurality of video frames of the first video, the method further comprises:

performing perspective transformation on the corresponding first video frames of the second video based on corner coordinates of the target sub-image comprised in the plurality of video frames of the first video, and performing, based on the plurality of first video frames of the second video after the perspective transformation, the operation of performing motion blur processing on the plurality of first video frames of the second video based on the region movement information of the plurality of video frames of the first video.

9. The method according to claim 8, wherein the performing perspective transformation on the corresponding first video frames of the second video based on corner coordinates of the target sub-image comprised in the plurality of video frames of the first video comprises:
   determining a perspective transformation matrix corresponding to each video frame of the first video based on relative positions between the corner coordinates of the target sub-image comprised in the plurality of video frames of the first video; and
   performing perspective transformation on the corresponding first video frames of the second video based on the perspective transformation matrix corresponding to each video frame of the first video.

10. The method according to claim 1, wherein the plurality of first video frames of the second video are an identical video frame before the motion blur processing and there is at least one difference between any two of the plurality of second video frames of the second video after the motion blur processing.

11. A computer device, comprising one or more processors and one or more memories, the one or more memories storing at least one program code, the at least one program code being loaded and executed by the one or more processors to implement a video data processing method, the method including:
   obtaining a first video and a second video;
   identifying a target sub-image defined by a photo frame within each of a plurality of video frames of the first video;
   determining region movement information of the target sub-image between every two adjacent video frames in the plurality of video frames of the first video, the region movement information comprising movement distances and movement directions of at least three corners of the target sub-image between every two adjacent video frames and being used for defining position movement of the target sub-image between every two adjacent video frames in the plurality of video frames of the first video;
   performing motion blur processing on a plurality of first video frames of the second video based on the region movement information of the target sub-image between every two adjacent video frames in the plurality of video frames of the first video, to obtain a plurality of second video frames of the second video, further comprising:
      determining at least three groups of convolution parameters based on the movement distances and movement directions of the at least three corners of the target sub-image between the $i^{th}$ frame and the $(i-1)^{th}$ frame of the first video, wherein the convolution parameters are used for indicating a size of a convolution region in one convolution operation and a movement direction of a convolution kernel, and i is an integer greater than 1;
      selecting, from a plurality of candidate convolution kernels of different sizes, a candidate convolution kernel whose size matches the size of the convolution region in each group of convolution parameters as a third convolution kernel;
      performing a convolution operation on a first video frame of the second video corresponding to the $i^{th}$ frame according to a movement direction in the corresponding convolution parameters by using the third convolution kernel corresponding to each group of convolution parameters, to obtain at least three intermediate video frames; and
      superimposing the at least three intermediate frames to obtain a second video frame of the second video corresponding to the $i^{th}$ frame of the first video; and
   embedding the second video into the first video by replacing the target sub-image in the plurality of video frames of the first video with the corresponding second video frames of the second video to obtain a target video.

12. The computer device according to claim 11, wherein the determining region movement information of the target sub-image between every two adjacent video frames in the plurality of video frames of the first video comprises:
   determining the target sub-image in the plurality of video frames of the first video; and
   determining the region movement information based on the position movement of the target sub-image between every two adjacent video frames in the plurality of video frames of the first video.

13. The computer device according to claim 12, wherein the determining the target sub-image in the plurality of video frames of the first video comprises:
   performing line segment detection on the plurality of video frames of the first video; and
   determining the target sub-image comprised in the plurality of video frames of the first video based on detected line segments.

14. The computer device according to claim 11, wherein the plurality of first video frames of the second video are an identical video frame before the motion blur processing and there is at least one difference between any two of the plurality of second video frames of the second video after the motion blur processing.

15. A non-transitory computer-readable storage medium, storing at least one program code, the at least one program code being loaded and executed by a processor of a computer device to implement a video data processing method, the method including:
   obtaining a first video and a second video;
   identifying a target sub-image defined by a photo frame within each of a plurality of video frames of the first video;
   determining region movement information of the target sub-image between every two adjacent video frames in the plurality of video frames of the first video, the region movement information comprising movement distances and movement directions of at least three corners of the target sub-image between every two adjacent video frames and being used for defining position movement of the target sub-image between every two adjacent video frames in the plurality of video frames of the first video;
   performing motion blur processing on a plurality of first video frames of the second video based on the region movement information of the target sub-image between every two adjacent video frames in the plurality of video frames of the first video, to obtain a plurality of second video frames of the second video, further comprising:

determining at least three groups of convolution parameters based on the movement distances and movement directions of the at least three corners of the target sub-image between the $i^{th}$ frame and the $(i-1)^{th}$ frame of the first video, wherein the convolution parameters are used for indicating a size of a convolution region in one convolution operation and a movement direction of a convolution kernel, and i is an integer greater than 1;

selecting, from a plurality of candidate convolution kernels of different sizes, a candidate convolution kernel whose size matches the size of the convolution region in each group of convolution parameters as a third convolution kernel;

performing a convolution operation on a first video frame of the second video corresponding to the $i^{th}$ frame according to a movement direction in the corresponding convolution parameters by using the third convolution kernel corresponding to each group of convolution parameters, to obtain at least three intermediate video frames; and superimposing the at least three intermediate frames to obtain a second video frame of the second video corresponding to the $i^{th}$ frame of the first video; and embedding the second video into the first video by replacing the target sub-image in the plurality of video frames of the first video with the corresponding second video frames of the second video to obtain a target video.

16. The non-transitory computer-readable storage medium according to claim 15, wherein the plurality of first video frames of the second video are an identical video frame before the motion blur processing and there is at least one difference between any two of the plurality of second video frames of the second video after the motion blur processing.

17. The computer device according to claim 11, wherein the superimposing the at least three intermediate frames to obtain a second video frame of the second video corresponding to the $i^{th}$ frame of the first video comprises:

determine a transparency parameter corresponding to each of the intermediate frames at each pixel based on a distance of each pixel of the $i^{th}$ frame of the first video relative to each corner; and superimposing corresponding pixels in the at least three intermediate frames based on the transparency parameter corresponding to each of the intermediate frames at each pixel, to obtain the second video frame of the second video corresponding to the $i^{th}$ frame of the first video.

18. The computer device according to claim 11, wherein before the performing motion blur processing on a plurality of first video frames of the second video based on the region movement information of the target sub-image between every two adjacent video frames in the plurality of video frames of the first video, the method further comprises:

performing perspective transformation on the corresponding first video frames of the second video based on corner coordinates of the target sub-image comprised in the plurality of video frames of the first video, and performing, based on the plurality of first video frames of the second video after the perspective transformation, the operation of performing motion blur processing on the plurality of first video frames of the second video based on the region movement information of the plurality of video frames of the first video.

19. The non-transitory computer-readable storage medium according to claim 15, wherein the superimposing the at least three intermediate frames to obtain a second video frame of the second video corresponding to the $i^{th}$ frame of the first video comprises:

determine a transparency parameter corresponding to each of the intermediate frames at each pixel based on a distance of each pixel of the $i^{th}$ frame of the first video relative to each corner; and superimposing corresponding pixels in the at least three intermediate frames based on the transparency parameter corresponding to each of the intermediate frames at each pixel, to obtain the second video frame of the second video corresponding to the $i^{th}$ frame of the first video.

20. The non-transitory computer-readable storage medium according to claim 15, wherein before the performing motion blur processing on a plurality of first video frames of the second video based on the region movement information of the target sub-image between every two adjacent video frames in the plurality of video frames of the first video, the method further comprises:

performing perspective transformation on the corresponding first video frames of the second video based on corner coordinates of the target sub-image comprised in the plurality of video frames of the first video, and performing, based on the plurality of first video frames of the second video after the perspective transformation, the operation of performing motion blur processing on the plurality of first video frames of the second video based on the region movement information of the plurality of video frames of the first video.

* * * * *